United States Patent
Yoon et al.

(10) Patent No.: US 10,474,513 B2
(45) Date of Patent: Nov. 12, 2019

(54) CLUSTER-BASED PROCESSING OF UNSTRUCTURED LOG MESSAGES

(71) Applicant: ORACLE INTERNATIONAL CORPORATION, Redwood City, CA (US)

(72) Inventors: Jae Young Yoon, San Mateo, CA (US); Dhileeban Kumaresan, Hyderabad (IN); Venktesh Alvenkar, Hyderabad (IN); Sreeji Das, Fremont, CA (US); Harish Akali, Acton, MA (US)

(73) Assignee: ORACLE INTERNATIONAL CORPORATION, Redwood City, CA (US)

(*) Notice: Subject to any disclaimer, the term of this patent is extended or adjusted under 35 U.S.C. 154(b) by 409 days.

(21) Appl. No.: 15/416,868

(22) Filed: Jan. 26, 2017

(65) Prior Publication Data

US 2018/0102938 A1    Apr. 12, 2018

Related U.S. Application Data

(63) Continuation of application No. 15/416,571, filed on Jan. 26, 2017.
(Continued)

(51) Int. Cl.
*G06F 9/54* (2006.01)
*G06F 16/28* (2019.01)
(Continued)

(52) U.S. Cl.
CPC ............ *G06F 9/546* (2013.01); *G06F 16/285* (2019.01); *G06F 16/338* (2019.01);
(Continued)

(58) Field of Classification Search
CPC ...... G06F 9/546; G06F 16/358; G06F 16/285; G06F 16/338; G06F 3/0482; H04L 41/069
See application file for complete search history.

(56) References Cited

U.S. PATENT DOCUMENTS

2011/0296244 A1   12/2011   Fu et al.
2015/0370799 A1*  12/2015   Kushmerick ......... G06F 16/285
                                                                     707/740
(Continued)

OTHER PUBLICATIONS

Liang Tang and Tao Li; LogTree: A Framework for Generating System Events from Raw Textual Logs; 10 pages (Year: 2010).*
(Continued)

*Primary Examiner* — S. Sough
*Assistant Examiner* — Kimberly L Jordan
(74) *Attorney, Agent, or Firm* — Kilpatrick Townsend & Stockton, LLP

(57) ABSTRACT

Some embodiments relate to assigning individual log messages to clusters. An initial cluster assignment may be performed by applying a hash function to one or more non-variable components of the message to generate an initial cluster identifier. Subsequently, clustering may be further refined (e.g., by determining whether to merge clusters based on similarity values). An interface can present a representative message of each cluster and indicate which portions of the message correspond to a variable component. Particular inputs detected at the input corresponding to one of these components can cause other values for the component to be presented. For a given cluster, timestamps of assigned messages can be used to generate a time series, which can facilitate grouping of clusters (with similar or complementary shapes) and/or triggering alerts (with a condition corresponding to a temporal aspect).

20 Claims, 18 Drawing Sheets

Related U.S. Application Data

(60) Provisional application No. 62/406,826, filed on Oct. 11, 2016.

(51) Int. Cl.
   *G06F 16/338*   (2019.01)
   *G06F 16/35*    (2019.01)
   *H04L 12/24*    (2006.01)
   *G06F 3/0482*   (2013.01)

(52) U.S. Cl.
   CPC .......... *G06F 16/358* (2019.01); *H04L 41/069* (2013.01); *G06F 3/0482* (2013.01)

(56) References Cited

U.S. PATENT DOCUMENTS

| | | | |
|---|---|---|---|
| 2015/0372855 A1* | 12/2015 | Kushmerick | ....... H04L 41/0613 709/224 |
| 2016/0373293 A1* | 12/2016 | Kushmerick | ....... H04L 41/0613 |
| 2017/0236023 A1 | 8/2017 | Debnath et al. | |
| 2017/0357710 A1 | 12/2017 | Shtossel et al. | |
| 2018/0101423 A1 | 4/2018 | Yoon et al. | |
| 2018/0101607 A1 | 4/2018 | Yoon et al. | |
| 2018/0114126 A1* | 4/2018 | Das | ........................ G06F 16/35 |

OTHER PUBLICATIONS

Tang et al., "LogTree: A Framework for Generating System Events from Raw Textual Logs", IEEE International Conference on Data Mining, Dec. 2010, 10 pages.

U.S. Appl. No. 15/416,571, First Action Interview Pilot Program Pre-Interview Communication dated Oct. 9, 2018, 5 pages.

U.S. Appl. No. 15/416,887, First Action Interview Pilot Program Pre-Interview Communication dated Oct. 5, 2018, 5 pages.

Ghelani, Ketan, "Announcing the new and improved Azure Log Analytics", Microsoft Azure, dated Aug. 9, 2017, accessed from the internet: https://azure.microsoft.com/en-us/blog/announcing-the-new-and-improved-azure-log-analytics/.

Kobielus, James, "Big data log analysis thrives on machine learning", InfoWorld, dated Jun. 18, 2014, accessed from the internet: https://www.infoworld.com/article/2608084/big-data/big-data-log-analysis-thrives-on-machine-learning.html.

* cited by examiner

| CORRELATE BY ▼ | COMPARE CLUSTERS | GROUP CLUSTERS | UN-GROUP CLUSTER | | |
|---|---|---|---|---|---|
| TREND | COUNT | SCORE | SAMPLE MESSAGE | | |
| ☒ ∿ | 16621 | 0 | ⚙▼ [192.168.1.1] [USER1] USER LOGGED OUT<br>▷ CLUSTER TIMELINE | | |
| ☒ ∿ | 10593 | 0 | ⚙▼ [MYHOST1.COMPANYNAME.COM] USER2 CHANGED ["PROPERTY 1"] OF<br>▷ CLUSTER TIMELINE | | |
| ☐ ∿ | 43198 | 0 | ⚙▼ ⓘ [MYHOST1.COMPANYNAME.COM] USER2 CHANGED ["PROPERTY 2"]<br>▷ CLUSTER TIMELINE | | |
| ☐ ∿ | 570967 | 0 | ⚙▼ [MYHOST4.COMPANYNAME.COM] [USER2] USER LOGGED IN VIA CLI<br>▷ CLUSTER TIMELINE | | |

FIG. 7D

CLUSTER-BASED PROCESSING OF UNSTRUCTURED LOG MESSAGES

CROSS-REFERENCE TO RELATED APPLICATIONS

This application is a continuation of U.S. application Ser. No. 15/416,571, filed on Jan. 26, 2017, which claims the benefit of and the priority to U.S. Provisional Application No. 62/406,826, filed on Oct. 11, 2016. Each of these applications is hereby incorporated by reference in its entirety for all purposes.

BACKGROUND

Many types of computing systems and applications generate vast amounts of data pertaining to or resulting from the operation of that computing system or application. These vast amounts of data are stored into collected locations, such as log files/records, which can then be reviewed at a later time period if there is a need to analyze the behavior or operation of the system or application.

Server administrators and application administrators can benefit by learning about and analyzing the contents of the system log records. However, it can be a very challenging task to collect and analyze these records. There are many reasons for these challenges.

One significant issue pertains to the fact that many modern organizations possess a very large number of computing systems, each having numerous applications that run on those computing systems. It can be very difficult in a large system to configure, collect, and analyze log records given the large number of disparate systems and applications that run on those computing devices. Furthermore, some of those applications may actually run on and across multiple computing systems, making the task of coordinating log configuration and collection even more problematic.

Conventional log analytics tools provide rudimentary abilities to collect and analyze log records. However, conventional systems cannot efficiently scale when posed with the problem of massive systems involving large numbers of computing systems having large numbers of applications running on those systems. This is because conventional systems often work on a per-host basis, where set-up and configuration activities need to be performed each and every time a new host is added or newly configured in the system, or even where new log collection/configuration activities need to be performed for existing hosts. This approach is highly inefficient given the extensive number of hosts that exist in modern systems. Furthermore, the conventional approaches, particularly on-premise solutions, also fail to adequately permit sharing of resources and analysis components. This causes significant and excessive amounts of redundant processing and resource usage.

Conventional log analytics tools are also very inefficient when it comes to the construction of log parsers used by the log analytics tools. A log parser is a tool that understands how to parse the entries within a log. Conventionally, a log parser must be manually constructed by a person that must be both knowledgeable about the exact format of the log file to be analyzed, as well as skilled in the specific programming infrastructure that would be used to implement the parser.

One problem with the conventional approach of manually constructing log parsers is that this process requires significant amounts of both time and resources from skilled technology personnel to build the parser. In addition, this approach also requires an inordinate amount of manual resources to maintain the parsers in the event of changes to the format of a log file. Moreover, this manual approach necessarily requires a priori knowledge of the log file formats.

SUMMARY

Some embodiments of the invention provide an approach to automatically construct a categorizer, which can automatically categorize multi-component machine-generated data records, such as log messages. Instead of requiring a person to manually assess the contents of machine-generated data record, the record contents themselves are used to construct the categorizer. For example, each of multiple machine-generated data records can be parsed into multiple components (e.g., using grammar rules), such that a value for each of the multiple components can be extracted from the machine-generated data record. Each component of the multiple components can be identified as a variable component (having multiple values across records in a data set) or a non-variable component (having a same value and/or similar values across records in a data set). The categorizer can identify a category or cluster for each log message, based at least in part, on the value(s) in the record for the non-variable component(s) and/or based on one or more merging rules (e.g., defined based on input from a user and/or automatically generated). Information for each of one or more clusters can be included in a user interface. The information can include representative data corresponding to a single machine-generated data record, such as a value for each variable component and/or part or all of the machine-generated data record. The interface can further include, for each variable component, an input features that, if selected, cause one or more other values—each associated with one or more other machine-generated data records in a category, cluster or data set—to be presented. Cluster assignments can be used to automatically track dynamics of clusters. For example, one or more rules and/or thresholds can be used to detect a new cluster or subsiding of an existing cluster, such that an alert can be generated and transmitted. In some instances, an alert identifies two (or more) clusters with complementary timing (e.g., one cluster subsiding or ending at a time that another cluster was beginning or was detected), and an option can be presented that receives input indicating that two (or more) clusters are to be merged together. Other additional objects, features, and advantages of the invention are described in the detailed description, figures, and claims.

In some instances, each of multiple machine-generated data records (e.g., log messages) may be assigned to a cluster that is representative of the content and/or structure of the machine-generated data record. A machine-generated data record can include any collection of data, such as a log message, a device communication, or a digital file. Each of one, more or all of the machine-generated data records being used to identify clusters and/or being assigned to clusters can include (in part or in its entirety) unstructured data, which does not have a pre-defined data model or schema. One or more clustering processes can be performed at data ingest (which may occur synchronously or asynchronously with data generation by a respective machine, such as one with components being measured), query time (which may occur synchronously with respect to a user request to view data having particular characteristics or asynchronously with respect to the user request (for example, by accessing a cache) if the user request pertains to data having frequently requested characteristics), or between ingest and query time. As one illustration, an initial clustering performed at ingest may include parsing each machine-generated data record into components, detecting which component(s) are non-variable component(s) using one or more grammar rules, and hashing the value(s) for the non-variable component(s) to produce a result corresponding to an initial cluster. It will be appreciated that initial component detection and/or initial component classifications may be subsequently refined. For example, a combination of multiple components (e.g., with two components having been initially characterized as variable) may be combined into a single component (e.g., where an initial processing identifies 03:59:01 as including three variable components and a subsequent processing groups the components into one variable component.

After ingest but before receiving a given query, multiple clusters may be merged together based on one or more merging rules, which may be defined in response to user input (e.g., explicitly defining the one or more merging rules or having identified similar cluster grouping so as to support learning of the one or more merging rules). At query time, Upon receiving a query, a preliminary response can be generated based on the initial and/or merged clusters. The preliminary response may be assessed to determine whether and/or what further clustering is to be performed. For example, further clustering may be performed to merge similar clusters when a number of clusters exceeds a defined upper threshold and/or when a number of machine-generated data records in a cluster (e.g., or statistic thereof across multiple clusters, such as an average, maximum, median, mode or minimum) is below a defined lower threshold.

A clustering process (e.g., performed at ingest) can include, for example, applying one or more grammar rules to individual messages. In some instances, a first grammar rule can be used to parse a machine-generated data record into multiple components. The first grammar rule may, for example, be configured to detect general or particular punctuation (e.g., a period, colon, hyphen, slash or backslash), symbol (e.g., equal sign) or spacing feature (e.g., a new-line, new-paragraph, new-column, or new-row indicator) that corresponds to separation of consecutive components and/or a capital letter (e.g., generally or following a non-letter) that corresponds a beginning of a component. A second grammar rule can be used to identify one or more likely variable components from a machine-generated data record that includes potentially non-variable components and, optionally, normalized variable components. For example, a grammar rule can be configured to detect a word that is unlikely to be non-variable, such as:

A word that includes characters and numbers (e.g., abc123);
A URL grammatical pattern (e.g., <protocol>:[optional port]//<path>);
A file-path pattern (e.g., [letter]:/[string]/ . . . );
A value part of a key/value pair (e.g., "[number]" of a [variable]=[number] pair);
A word that includes only numerical digits;
A HexNumeric string (e.g., ff00ab);
A digit "." string (e.g., [number1].[number2].[number3] . . . );
A word "." string (e.g., [word1].[word2].[word3] . . . );
A WordAtWord string (e.g., [word1]@[word2].[word3]);
A timestamp;
A Java Stack Trace (e.g., NullPointerException.
 at sun.reflect.NativeMethodAccessorImpl.invoke0(Native Method) ~[?:1.7.0_79] at
 sun.reflect.NativeMethodAccessorImpl.invoke(NativeMethodAccessorImpl.java:57) ~[?:1.7.0_79]);
Embedded HTML; or
Embedded XML.

A preliminary skeleton or final skeleton for the machine-generated data record can be generated by modifying the machine-generated data record to, for example, exclude each variable component and/or replace each variable component with a placeholder, such as a template string. For example, the placeholder may appear as "[HEXNUMERIC]" or "% HEXNUMERIC %" for a hexnumeric string in a skeleton (where brackets or percent signs are being used as example markers of the placeholder), such as "ALERT: The value of [HEXNUMERIC] has exceeded the threshold. In some instances, one or more grammar rules are defined to particularly detect messages that particularly correspond to a skeleton.

A skeleton may reflect word or component positions. For example, a skeleton may indicate that a component begins at an nth character, word, line, etc. in a record. As another example, a skeleton may identify relative positions of components, such as an indication that a record begins with a particular non-variable component, followed by a variable component comprised of one or more digits, followed by another particular non-variable component. The length of the middle variable component may differ across machine-generated data records, but the skeleton may nonetheless convey the position of the other particular non-variable component. Position information can correspond to important distinctions between machine-generated data records, which can be used to separate such different types of records into different categories. For example, if a non-variable component included a common word, such as "is" or "am", the word itself may have limited or no meaning. However, its presence at a particular location in a skeleton may be significant, as it may add context or meaning to neighboring words or components.

In some (alternative or additional) instances, a grammar rule can be used to identify each potentially non-variable component (or otherwise referred to as non-variable token) of the machine-generated data record to form a skeleton of potentially non-variable components. For example, a grammar rule can be configured to detect words or grammatical patterns that commonly form parts of a skeleton, such as "IS", "HOSTNAME:" (word or certain keyword plus colon), a key (e.g., "[variable]="), items that correspond to java stack traces (e.g, at "x.y.z.java:"), contiguous alphabets after variables have been removed, containers for a value in a key/value pair (e.g., double or single quotations or parentheses, such as those illustrated in: "value", 'value', (value)), any word identified in a dictionary look-up.

In some instances, one or more grammar rules may be specific to a context, such as a log context. For example, it may be determined (e.g., based on a data source and/or message assessment) that a record corresponds to a log message. One or more log-specific grammar rules for log messages may then be retrieved and applied. The one or more log-specific grammar rules may identify particular types of variables known or estimated to be in the message. The one or more log-specific grammar rules may, for example, supplement or override one or more other (e.g., corresponding) grammar rules. For example, a log-specific grammar rule may indicate that a URL rule is not to be applied to a web-access log. Grammar rules may further be specific to a client, source of a machine-generated data record and/or destination of a data destination.

It will be appreciated that detections may be performed in various orders. For example, one or more grammar rules may first be applied to detect each variable component in a machine-generated data record. The remaining components may be identified as being non-variable, and/or they may be further assessed using one or more other grammar rules to determine whether they are to be characterized as being non-variable. This order may be advantageous as variable components may potentially have less variability with regard to structure or identifying features as compared to non-variable components. Alternatively, non-variable components may be detected before variable components, with the remaining undetected components being classified as variable.

A processing algorithm (e.g., removing punctuation and then applying a hash algorithm) can be applied to a skeleton that includes the non-variable component(s) (but that excludes or transforms variable component(s)) of each individual machine-generated data record, and the result can uniquely map the machine-generated data record to a cluster. In some instances, when this clustering technique is performed at ingest, full machine-generated data records need not be stored. Rather, for each machine-generated data record, an identifier of the record can be stored in association with both an identifier of a cluster (or corresponding identifier, such as an identifier of a hash or skeleton) and also a value for each variable component represented in the skeleton for the cluster. The full machine-generated data record can then be reconstructed by (for example) combining the skeleton of the cluster and the value(s) of the variable component(s) (e.g., by replacing each variable-component placeholder in a skeleton with a value for the component or by inserting each variable-component value into the skeleton at one or more position(s) as identified by indicated by the skeleton and/or being associated with the cluster).

In some instances, clusters are further processed to merge multiple initial clusters together. The cluster merging may occur, for example, prior to or subsequent to receiving a query. The merging may be performed based on input received from one or more users and/or based on automated processing. As one example, data may have presented responsive to previous queries that identifies information corresponding to multiple clusters. An interface may be configured to receive input corresponding to an instruction to merge two or more of the multiple clusters together. The interface may, in some instances, further include an option that corresponds to an instruction to thereafter group the clusters together, or a learning algorithm may automatically subsequently group the clusters together (e.g., always or upon determining that one or more conditions are satisfied, such as a condition as a query having been received from a same device or client, a number or percentage of records assigned to a cluster being below a threshold, or a number of clusters exceeding a threshold).

While (e.g., preliminary or final) cluster assignments and/or merging may be determined using potentially non-variable components of a message, subsequent presentations and/or processing may further use variable components of some or all messages. In some instances, one or more representative machine-generated data records are selected for each cluster (e.g., a preliminary, final or merged cluster). Representative message(s) may be presented in response to receipt of a query. Part or all of the one or more representative machine-generated data records may then be presented to represent a cluster. In some instances, an entire representative machine-generated data record is presented to present a cluster. In some instances, a value of each of one, more or all variable components of a representative machine-generated data record is presented. A query may include one or more criteria that can be used to identify a set of machine-generated data records that satisfy each of the one or more criteria. Rather than presenting each machine-generated data record in the set of machine-generated data records, it may be determined to which clusters the set of machine-generated data records pertain, and information pertaining to those clusters may be presented. The information may include—for each determined cluster—a selected representative machine-generated data record.

The machine-generated data record may be selected, for example—using a random or pseudo-random selection technique and/or using a technique to select a record from amongst all or some of the records assigned to the cluster. The selection can alternatively or additionally include assessing—for each of one, more or all of the variable components in a machine-generated data record—whether a value for the variable component matches a value on a prioritized list. The prioritized list may include values that include, represent or correspond to an alarm, alert, error, notification, or warning. For example, the list may include one or more word-type variations on "error", "fail", "unable", "abort", "exception", "timeout", "deadlock", "crash", "stuck", "exception", "inconsistent", "not start" "does not" or "disable". The prioritized list may include or consist of one or more terms defined by a user (e.g., an authorized user corresponding to a client) and/or one or more terms automatically detected to correspond to operational significance (e.g., to be temporally associated with a system or transaction event, such as a system failure or transaction failure).

The selection can alternatively or additionally include using one or more random or pseudo-random selection techniques. For example, a machine-generated data record can be selected using a pseudo-random selection technique from amongst all query-responsive machine-generated data records in a cluster. As another example, a pseudo-random or random selection can be made across all machine-generated data records in a cluster that includes one or more most prevalent or prevalent (e.g., above-threshold) values for each of one, more or all variable components.

The representative log message(s) can be used to (for example) represent cluster(s) via a graphical user interface, to determine whether select clusters are to be merged and/or to assess cluster characteristics. In some instances, one or more statistics are presented in association with representations of each cluster. For example, a statistic may identify a number of query-responsive machine-generated data records assigned to a cluster and/or a time series representing occurrences of timestamps for machine-generated data records assigned to a cluster.

In some instances, part (e.g., one or more values of one or more corresponding variable components) or all of a representative machine-generated data record of a cluster is presented (e.g., at a webpage, app page, or other graphical user interface) with one or more options configured to facilitate discovery of one or more alternative values of each of one, more or all variable components of the machine-generated data record. For example, for each variable component in the machine-generated data record, the component can be presented so as to indicate that it is a variable component (e.g., via a different color), and the indication can include or can otherwise be associated with a selectable option (e.g., a clickable or touchable arrow, outline, underline, or selectability of the component itself) that facilitates presenting one, more, some, or all other values for the variable component from other machine-generated data records in the same cluster. For example, a selection may cause a pop-up window with a defined number of other values for the variable component from the subset (e.g., pseudo-randomly selected or identified as being the most prevalent values in the subset). As another example, a selection may cause a new webpage to be displayed that identifies some or all other values for the corresponding variable component and an associated count for each value identifying a number of log messages in the cluster having the value. Through selections such as these, the interface allows a drill-down operation that progressively fixes values of variables within a selected skeleton and progressively shows more of the variability, more of the sample, and/or more aggregation statistics for the selected fixed values.

Upon a selection of one or more variable value(s) to fix within a skeleton's pattern, the other value(s) may be presented in isolation (e.g., showing a list of other values) or in a context of the rest of the machine-generated data record. For example, for each identified other value, a representative log message that includes the other value (e.g., and the non-variable components of the message) can be presented. In various implementations, with respect to each of one or more unselected variable components, the representative log message may, or may not, include a same value for the unselected component as the value in the original representative message. The interfaces may further be configured to enable drill-down to various levels of detail corresponding to particular messages in a cluster. For example, selecting a representative message corresponding to one of the other values for a variable component may cause the message to be similarly represented so as to indicate variable components and selections that trigger presentations of other values for each variable component. As another example, an interface may include one or more options that receive input for filter inputs, each of which can define a constraint for a variable component (e.g., to be set to a value of the representative message of the cluster). A subset of the cluster corresponding to one or more constraints corresponding to filter interactions can then be identified and used for assessments (e.g., generation of statistics) and/or exploration.

Clustering machine-generated data records facilitates generating focused time series that may represent various events. For example, real-time or post-hoc clustering can be used to assign each of multiple machine-generated data records to one of a set of clusters. Then, for each cluster, a time series can be generated that identifies a number of records assigned to the cluster that have a timestamp in each of a multiple time bins. The time series can be processed to identify (for example) an initial detection time (associated with the earliest timestamp(s) from the cluster), a cessation time (associated with the latest timestamp(s) from the cluster), and/or one or more temporal trends. These results can be presented via an interface, used to trigger an alert and/or used for a cluster-grouping analysis. For example, multiple clusters may be automatically grouped or proposed for grouping (e.g., via a communication to a user device) if they have complementary and/or corresponding time-series events (e.g., one cluster having a cessation time similar to another cluster's initial detection time, the clusters having complementary temporal trends, or the clusters having similar temporal trends). Similarity can also account for a combination of characteristics, such as clusters having similar endpoints (cessation time similar to initial detection time) and clusters having similar skeletons (differing by a small number of words, optionally relative to the size of the skeleton). In one embodiment, an interface shows clusters and their cessation time(s) and initial detection time(s) on a chart, optionally grouped together, showing volume of machine-generated data records satisfying the grouped clusters over time. In the same or a different embodiment, upon receiving a selection, via the interface, to group two or more clusters together, a system may merge identifiers for the different clusters such that a single identifier is useable to identify the group going forward, such that queries received in relation to the group or any cluster(s) in the group are answered, via the interface, by pulling and displaying data from all of the clusters in the group. In one example, the identifiers are merged by creating a new identifier, optionally of a same size as existing identifiers for clusters in the group, and mapping the existing identifiers to the new identifier.

When two clusters are grouped, an interface may be generated that identifies time-series data for each of the clusters. For example, a stacked bar graph can be shown that identifies, for each time bin, a count of log records in each cluster (e.g., via a different color or pattern). In one embodiment, a stacked graph visually distinguishes between different clusters such that a total aggregate can be seen for the group as well as an amount that each cluster contributes to that total aggregate. In one embodiment, the interface also includes options for toggling on or off visibility of different cluster members and adjusting the total aggregate up or down according to which cluster members are currently selected and being shown on the interface. In some instances, the interface concurrently identifies how the clusters differ, such as by presenting—for each cluster—a representative message and/or a "skeleton" message that identifies non-variable components and generically identifies positions for any variable components. The interface may include an option to request, accept, or reject grouping of the clusters and/or to explore more detailed data for a cluster (e.g., cluster statistics, other values for one or more variable components, etc.).

In some embodiments, a plurality of log messages is received. For each log message of the plurality of log message, the log message is parsed into a plurality of components. Each component of the plurality of components corresponding to a part of the log message. For each log message of the plurality of log message and for each component of the plurality of components, it is determined whether the component is a variable component or a non-variable component. When the component is identified as a variable component, a cluster that identifies any messages matching the component is defined such that a value for the component is allowed to differ across log messages in the cluster while sharing a same cluster identity. When the component is identified as a non-variable component, a cluster that identifies any messages matching the component is defined such that a value for the component must be the same across log messages in the cluster to share the same cluster identity. For each log message of the plurality of log message and for each of one or more non-variable components of the plurality of components determined to be a non-variable component, a value for the non-variable component is determined from the log message. For each log message of the plurality of log message, the log message is assigned to a cluster of a set of clusters based at least in part on one or more values of the one or more non-variable components and one or more rules. A message identifier of the log message is stored in association with a cluster identifier corresponding to the cluster.

In some embodiments, a data store is accessed that associates, for each machine-generated data record of a set of machine-generated data records, an identifier of the machine-generated data record with one or more value identifiers. Each value identifier of the one or more value identifiers represents one or more values included within the machine-generated data record. A representative log message is selected from amongst the set of machine-generated data records. For each component of a plurality of components of the representative machine-generated data record, a value for the component is identified that is included in a part of the representative machine-generated data record that corresponds to the component. For each component of a plurality of components, it is determined that the component corresponds to a variable component, thereby indicating that the set of machine-generated data records includes one or more other values for the component. A presentation is facilitated that includes, for each component of the plurality of components the value for the component and one or more interactive options configured to, upon detecting input of a defined type corresponding to the value, identify at least one of the one or more other values for the component. Each of the at least one of the one or more other values is included in a part of another machine-generated data record in the set of machine-generated data records.

In some embodiments, a log message is received. The log message is parsed into a plurality of components Each component of the plurality of components corresponds to a part of the log message. For each of one or more components of the plurality of components, a value for the component from the log message is determined. A cluster identifier is determined based at least in part on one or more values of the one or more components and one or more rules. A data store is accessed that associates, for each log message of a plurality of previously processed log messages, an identifier of the log message with an identifier of a corresponding cluster. The association with the corresponding cluster indicates that the log message has one or more content-based characteristics indicative of the corresponding cluster and is assigned to the corresponding cluster. The corresponding cluster is one of a plurality of clusters. The data store is queried with the cluster identifier. It is determined, based on a response to the query, that the cluster identifier corresponds to a new cluster. In response to determining that the cluster identifier corresponds to a new cluster, an alert communication is generated that includes information that identifies the cluster.

In some instances, various actions and/or combinations thereof may be performed as a method. In some instances, a computer-program product tangibly embodied in a non-transitory machine-readable storage medium includes instructions configured to cause one or more data processes to perform various actions and/or combinations thereof. In some instances, a computer-implemented system includes one or more data processors and a non-transitory computer-readable storage medium containing instructions, which, when executed on the one or more data processors, cause the one or more data processors to perform actions including various actions and/or combinations thereof.

The following detailed description together with the accompanying drawings will provide a better understanding of the nature and advantages of the present disclosure.

BRIEF DESCRIPTION OF THE DRAWINGS

Illustrative embodiments of the present invention are described in detail below with reference to the following drawing figures:

FIGS. 7A-7E show example user interfaces for presenting processed log data according to some embodiments.

DETAILED DESCRIPTION

Figure 1A:
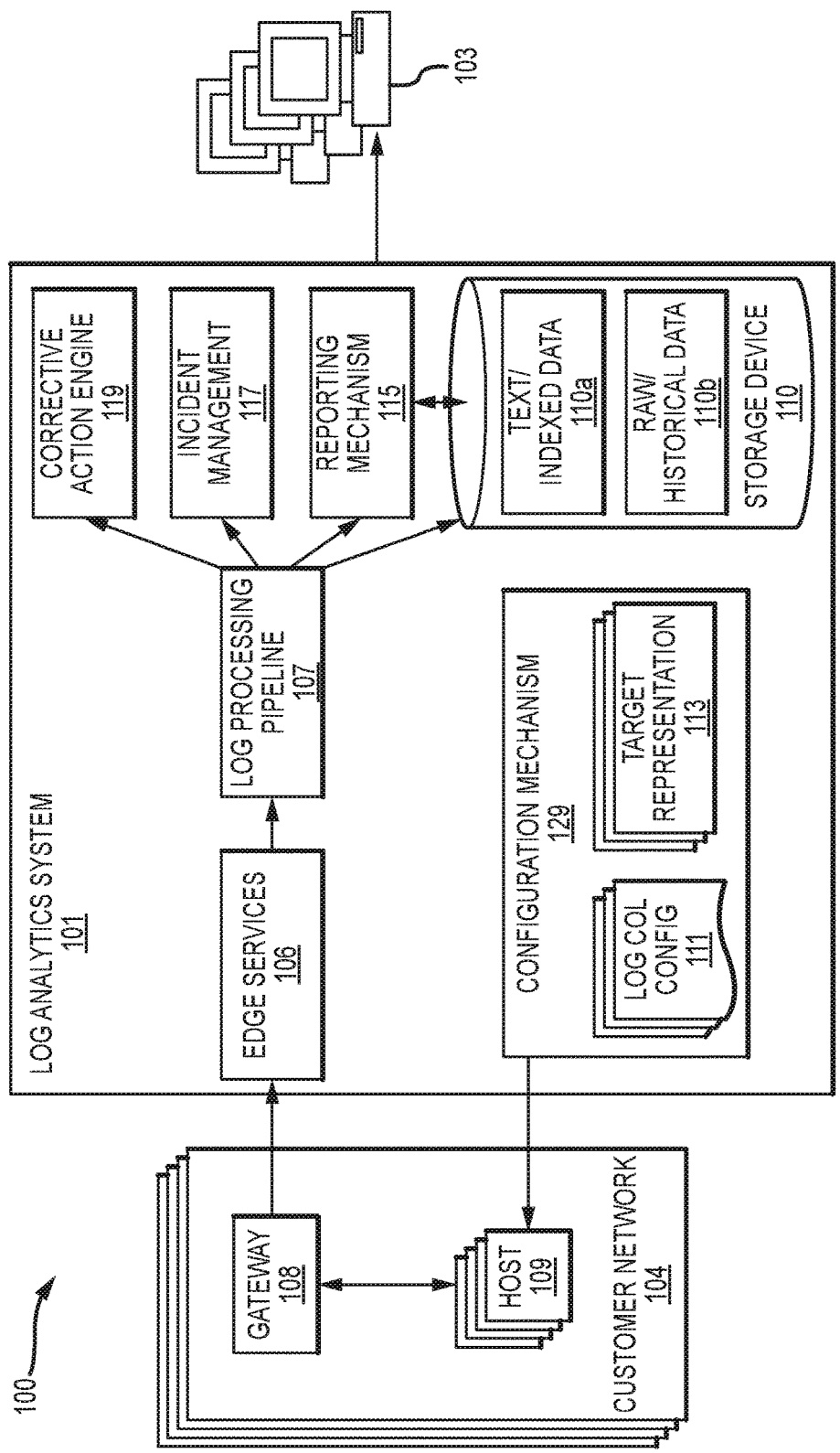
FIG. 1A illustrates an example system for configuring, collecting, and analyzing log data according to some embodiments of the invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

As noted above, many types of computing systems and applications generate vast amounts of data pertaining or resulting from operation of that computing system or application. These vast amounts of data are frequently then stored into collected locations, such as log files/records, which can be reviewed at a later time period if there is a need to analyze the behavior or operation of the system or application.

Some embodiments relate to processing of "log" data and/or log messages. A log message can include a set of log data that is configured to be written to a log (e.g., in a time-ordered and/or real-time manner). Log data may include multiple components that each correspond to a field. Log data may include one or more field tags that identify a field and/or one or more field values that include a value for a particular field. A log message may include (for example) a record from an event log, a transaction log, or a message log. In some instances, log data in each of one, more or all log messages represents an event (e.g., powering on or off of a device or component, a successful operation having been completed by a device or component, a failure of an operation having been initiated at a device or component, receiving a communication from a device or component, or transmitting a communication to a device or component).

Log data may further identify (for example) a time stamp, one or more devices (e.g., by IP address) and/or one or more device or operation characteristics (e.g., identifying an operating system or browser).

While the below description may describe embodiments by way of illustration with respect to "log" data, processing of other types of data are further contemplated. Therefore, embodiments are not to be limited in its application only to log data. In addition, the following description may also interchangeably refer to the data being processed as "records", "machine-generated data records", "log messages" or "messages", without intent to limit the scope of the invention to any particular format for the data. A machine-generated data record may include or may be (for example) a log message, an electronic file (e.g., a document, spreadsheet, or image file) and/or a communication (e.g., a post onto a website, SMS message, or email).

A machine-generated data record may include machine-generated data, such as data generated by a server, security device, access control device, or computer. In some instances, a machine-generated data record is generated by a machine automatically (e.g., in response to an event, such as receipt of a communication, detecting a defined time or completion of a defined time interval, detecting satisfaction of a condition such as one that relates to data storage, sensor reading, and/or operation of a computer system). In some instances, a machine-generated data record is generated without relying on recent human input (e.g., local human input) to define what data is to be included and/or to trigger generation of and/or transmission of the machine-generated data record. A machine-generated data record may be represented in a log message in a machine-readable manner. A machine-generated data record may, or may now, be human-readable. A machine-generated data record be structured, semi-structured or unstructured. In some examples, data in a machine-generated data record may include XML or JSON data.

FIG. 1A illustrates an example system 100 for configuring, collecting, and analyzing log data according to some embodiments of the invention. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each customer that needs the service does not need to individually install and configure the service components on the customer's own network. The log analytics system 101 is capable of providing the log analytics service to multiple separate customers, and can be scaled to service any number of customers.

Each customer network 104 may include any number of hosts 109. The hosts 109 are the computing platforms within the customer network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each customer network to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs. In some embodiments, the user stations 103 may be (although not required to be) located within the customer network 104.

The log analytics system 101 comprises functionality that is accessible to users at the user stations 101, where log analytics system 101 is implemented as a set of engines, mechanisms, and/or modules (whether hardware, software, or a mixture of hardware and software) to perform configuration, collection, and analysis of log data. A user interface (UI) mechanism generates the UI to display the classification and analysis results, and to allow the user to interact with the log analytics system.

Figure 1B:
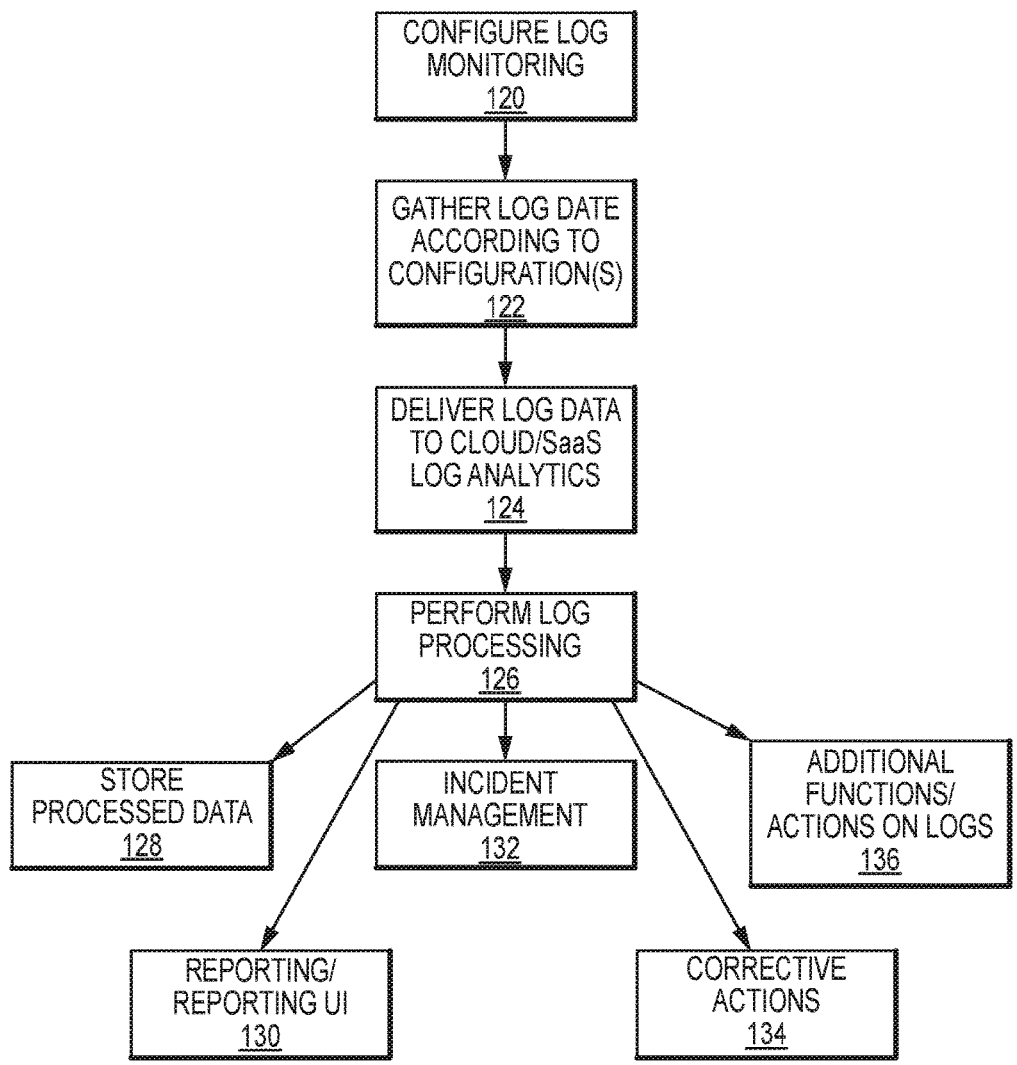
FIG. 1B shows a flowchart of a process for configuring, collecting, and analyzing log data according to some embodiments.

FIG. 1B shows a flowchart of an approach to use system 100 to configure, collect, and analyze log data. This discussion of FIG. 1B will refer to components illustrated for the system 100 in FIG. 1A.

At 120, log monitoring is configured within the system. This may occur, for example, by a user/customer to configure the type of log monitoring/data gathering desired by the user/customer. Within system 101, a configuration mechanism 129 comprising UI controls is operable by the user to select and configure log collection configuration 111 and target representations 113 for the log collection configuration.

The log collection configuration 111 comprises the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-of-the-box rules that are included by a service provider. The log collection configuration 111 may also include customer-defined/customer-customized rules.

The target representations 113 identify "targets", which are individual components within the customer environment that that contain and/or produce logs. These targets are associated with specific components/hosts in the customer environment. An example target may be a specific database application, which is associated with one or more logs and/or one or more hosts.

The next action at 122 is to capture the log data according to the user configurations. The log data may originate from any log-producing source location, such as a database management system, database application, middleware, hardware logs, operating system logs, application logs, application server logs, database server logs, and any other type of log that monitors the behavior of a system or application.

In some instances, the association between the log rules 111 and the target representations is sent to the customer network 104 for processing. An agent of the log analytics system is present on each of the hosts 109 to collect data from the appropriate logs on the hosts 109.

In some embodiments, data masking may be performed upon the captured data. The masking is performed at collection time, which protects the customer data before it leaves the customer network. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to "***" symbols), or changed to data that is mapped so that the original data can be recovered.

At 124, the collected log data is delivered from the customer network 104 to the log analytics system 101. The multiple hosts 109 in the customer network 104 provide the collected data to a smaller number of one or more gateways 108, which then sends the log data to edge services 106 at the log analytics system 101. The edge services 106 receives the collected data one or more customer networks, perform any intake processing (e.g., applying grammar rules to transform each message into a normalized message or skeleton message that lacks components of inter-cluster message variability and assigning each transformed message to an initial cluster identified using a hash of the transformed message) and may place the data into an inbound data store for further processing by a log processing pipeline 107.

At 126, the log processing pipeline 107 performs a series of data processing and analytical operations upon the collected log data. In various instances, the processing and analytical operations can include actions performed prior to storing the data and/or by performing actions on data retrieved from a data store. For example, one or more log messages may be assigned to initial clusters at an ingest time (e.g., upon receiving the log message(s) from a source), and the log message(s) may be subsequently retrieved in response to a query to modify or supplement the initial clustering and generate statistics and/or presentations based on the clustering. To illustrate, a log message may be initially processed to identify each value in the log message that corresponds to a non-variable component. The values may be processed in accordance with a hashing algorithm to generate a hashing result that is used as or that corresponds to an identifier of an initial cluster. In some instances, a rule may be subsequently defined (e.g., based on user input or machine learning) that indicates that the initial cluster is to be merged with one or more initial clusters, and the log message may be accordingly assigned to the merged cluster. During processing of a query, it may be detected that the log message meets the query constraints and also that a post-query clustering condition is satisfied (e.g., based on a number of clusters to which query-responsive messages were assigned exceeding a threshold and/or based on a number of query-responsive messages assigned to each of one or more clusters falling below a threshold). In response to the detection, further cluster merging may be performed (e.g., based on comparing and/or merging clusters having a same or similar number of components and/or sharing one or more values).

At 128, the processed data is then stored into a data storage device 110. Processed data may include storing an identifier of a log message in association with an identifier of a cluster. In various instances, a log message may, or may not, be stored in its entirety. For example, rather than storing a log message in its entirety, stored data may instead identify a value for each of one or more variable components and an identifier of a skeleton. This data may then be used to reconstruct a message if subsequently needed or requested. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110*a* (e.g., as a SOLR cluster) and a raw/historical data store 110*b* (e.g., as a HDFS cluster).

A SOLR cluster corresponds to an Apache™ open source enterprise search platform. The SOLR cluster can use a search library to perform full-text indexing and searching of data stored in a HDFS cluster. The SOLR cluster can provide APIs compatible with various languages to interface the searching functions with other programs and applications. Indexing can be performed in near real-time. The cluster can operate on a set of servers so as to facilitate fault tolerance and availability. Indexing and search tasks can be distributed across the set of servers.

An HDFS cluster corresponds to a Hadoop Distributed File System cluster. The HDFS cluster can include many (e.g., thousands) of servers to host storage (e.g., directly attached storage) and execute tasks, such as tasks defined by user applications. The HDFS cluster can include a master/slave architecture with a single master server for managing a namespace of the cluster. A file can be divided into blocks to be stored at multiple DataNodes of the HDFS cluster. The master server can perform file operations (e.g., open, close, etc.) and determine which blocks are to be stored on which data nodes. The master server can communicate with data nodes for requests to read or write data in response to receipt of corresponding file operations.

Figure 2:
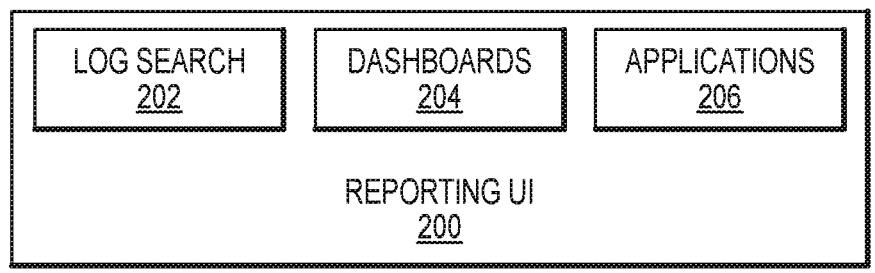
FIG. 2 shows an example reporting user interface.

At 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below. In some instances, reporting is performed in response to a query. Reporting may therefore, in some instances, occur with some delay with respect to the log processing performed at 126 and/or storage performed at 128. Further, processing of a query to generate a report may include further log processing and storage. A report may be provided, for example, via a web interface, application interface, email transmission or file download.

At 132, incident management may be performed upon the processed data. One or more alert conditions can be configured within log analytics system such that upon the detection of the alert condition, an incident management mechanism 117 provides a notification to a designated set of users of the incident/alert.

At 134, a Corrective Action Engine 119 may perform any necessary actions to be taken within the customer network 104. For example, a log entry may be received that a database system is down. When such a log entry is identified, a possible automated corrective action is to attempt to bring the database system back up. The customer may create a corrective action script to address this situation. A trigger may be performed to run the script to perform the corrective action (e.g., the trigger causes an instruction to be sent to the agent on the customer network to run the script). In an alternative embodiment, the appropriate script for the situation is pushed down from the server to the customer network to be executed. In addition, at 136, any other additional functions and/or actions may be taken as appropriate based at last upon the processed data.

Figure 3A:
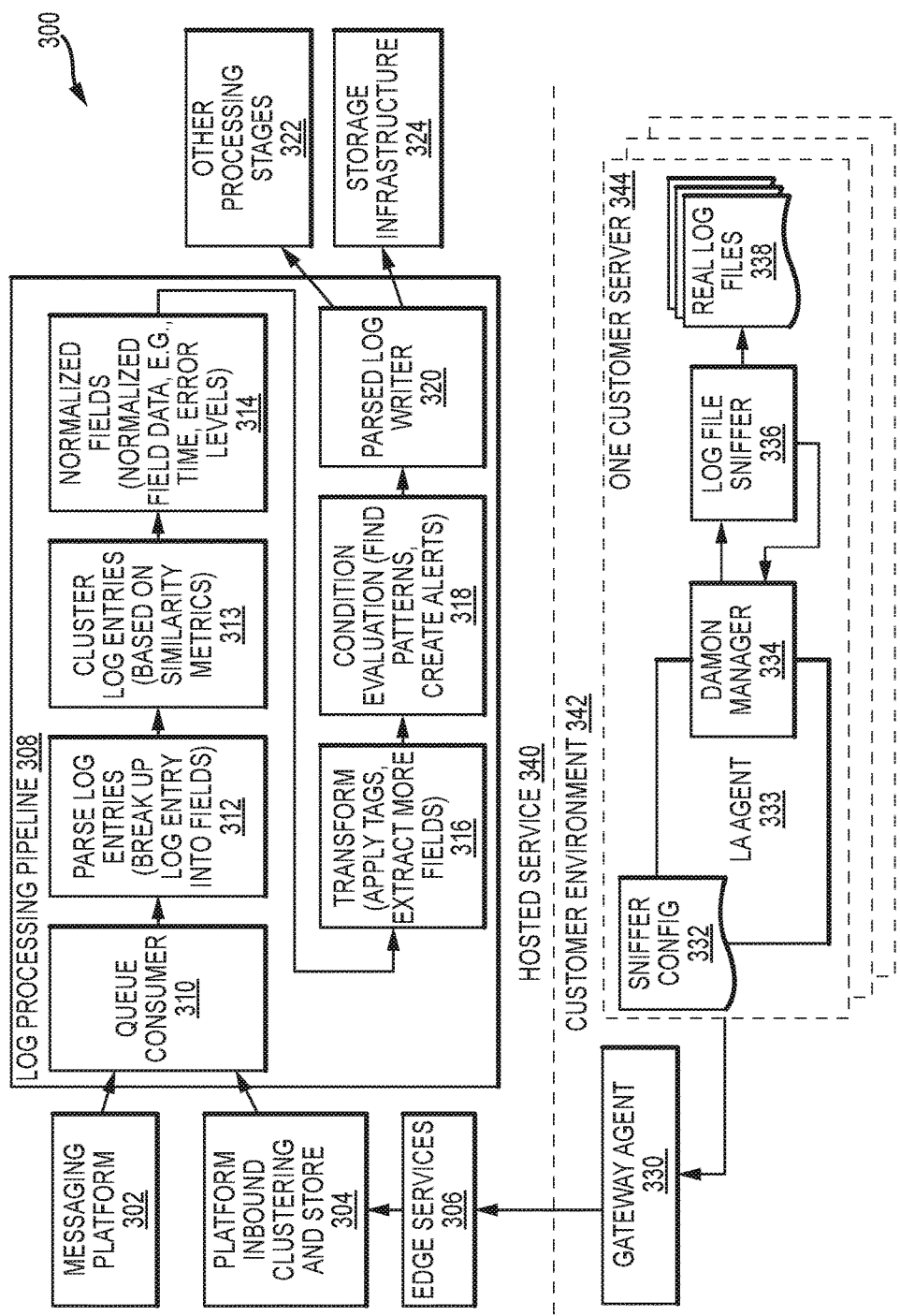
FIGS. 3A-3C provide illustrations of the components and actions associated with a host environment and customer environment for processing log data according to some embodiments.

FIG. 3A provides a more detailed illustration of the internal structure of the log analytics system at a host environment 340 and the components within the customer environment 342 that interact with the log analytics system. This architecture 300 is configured to provide a flow for log monitoring that is able to handle large amounts of log data ingest.

In the customer environment 342 within a single customer host/server 344, the LA (log analytics) agent 333 takes the log monitoring configuration data 332 (e.g., sniffer configuration or target-side configuration materials), and calls a log file 336 sniffer (also referred to herein as the "log collector") to gather log data from one or more log files 338.

A daemon manager 334 can be employed to interface with the log file sniffer 336. The log file sniffer 336 reads from one or more log files 338 on the host machine 344. The daemon manager 334 takes the log content and packages it up so that it can be handed back to the LA agent 333. It is noted that the system may include any number of different kinds of sniffers, and a log sniffer 336 is merely an example of a single type of sniffer that can be used in the system. Other types of sniffers may therefore be employed within various embodiments of the invention, e.g., sniffers to monitor registries, databases, windows event logs, etc. In addition, the log sniffer in some embodiments is configured to handle collective/compressed files, e.g., a Zip file.

The LA agent 333 sends the gathered log data to the gateway agent 330. The gateway agent 330 packages up the log data that is collected from multiple customer hosts/servers, essentially acting as an aggregator to aggregate the log content from multiple hosts. The packaged content is then sent from the gateway agent 330 to the edge services 306. The edge services 306 receive a large amount of data from multiple gateway agents 330 from any number of different customer environments 342.

Given the potentially large volume of data that may be received at the edge services 306, the data can be immediately processed to assign each log message to an initial cluster and stored into an inbound data storage device 304 (the "platform inbound clustering store"). For example, SOLR can be used to index log messages to identify initial cluster assignments. In some instances, an initial or preliminary processing may be performed at an ingest time, which can include a time corresponding to (e.g., before, shortly or immediately after, or concurrent with) storage of the data and/or a time corresponding to receipt of the data. The initial or preliminary processing may include (for example) parsing each log message into multiple components. The parsing may be performed using one or more parsing grammar rules. For example, a parsing grammar rule may assess a log message to detect particular punctuation, capitalization, character types (or changes in character type), and so on, which may correspond to a separation between components, a beginning of a component, or an end of a component.

As a result of the parsing, a value for each of the multiple components can be extracted from the log message. It can then be determined, for each value, whether the value corresponds to a non-variable component or a variable component. A non-variable component may include (for example) a field tag. In some instances—but not others—a field value may also be identified as a non-variable component. For example, part of a log message may include: "Power: ON", such that "ON" is a value for a power field. While the value may vary across records, a limited number of potential values (e.g., "ON" and "OFF") and/or grammar rules (e.g., that may identify character strings to be non-variable components) may identify the value as being non-variable.

An initial cluster may be determined based on the value for each identified non-variable component. For example, a hashing technique may be applied to a combination of each value of each non-variable component to generate an identifier of the initial cluster. The log message may then be stored in association with the identifier of the initial cluster or other cluster data can be stored to indicate that the log message is associated with the initial cluster. In some instances, a cluster assignment may be updated (e.g., at ingest or later) based on one or more rules, such as a merging rule. Cluster assignments may be further refined, enhanced and/or used during subsequent processing, such as during processing that occurs during a time of subsequent resource availability and/or in response to receiving a query for data corresponding to or potentially corresponding to the associated log messages.

Thus, in some instances, a queue is managed and maintained, where queue elements corresponding to one or more log messages for which cluster assignments are to be refined, enhanced and/or used. An element may be added to the queue (for example) subsequent to an initial storing of the queue element and/or in response to receiving a query for data corresponding to or potentially corresponding to one or more associated log messages. In some instances, an element is added to the queue (or processing of a queue is initiated) in response to a detection that a clustering condition is satisfied. For example, a clustering condition may be satisfied if a user defines a general merging rule (e.g., that identifies a type of component that is not to be characterized as variable based on, e.g., character type, a corresponding value for a non-variable component) or a specific merging rule (e.g., that identifies two or more clusters that are to be merged into a single cluster). The queue can be used for the log processing pipeline 308.

A data structure is provided to manage the items to be processed within the inbound data store. In some embodiments, a messaging platform 302 (e.g., implemented using the Kafka product) can be used to track the to-be-processed items within the queue. Within the log processing pipeline 308, a queue consumer 310 identifies the next item within the queue to be processed, which is then retrieved from the platform inbound store. The queue consumer 310 comprises any entity that is capable of processing work within the system off the queue, such as a process, thread, node, or task.

In some instances, the retrieved log data undergoes a parse stage 312, where the log entries are parsed and broken up into specific fields or components. The parsing can be performed in accordance with one or more grammar rules. The "log type" configured for the log specifies how to break up the log entry into the desired fields. In some instances, pipeline 308 does not include parse stage 312. Instead, subsequent processing may be performed on previous parsing, component detection, component characterization (e.g., as being variable or non-variable), preliminary cluster identification, and/or selective value storage from initial clustering and storage 304.

At a "cluster" stage 313, log data is further analyzed to assign individual log messages to a cluster. Specifically, multiple initial clusters to which log messages were assigned during an intake process (e.g., at 304) can be assessed to determine whether some of the initial clusters are to be merged together. The assessment can include identifying one or more representative samples for each cluster and performing pair-wise quantitative comparative assessments.

Cluster pairs assessed via a pair-wise comparative assessment can include clusters with log messages having same or similar number of components (or words). In some instances, each pair of clusters includes clusters associated with a number of components that are the same or different from each other by less than a threshold number (e.g., that is predefined, a default number, or identified by a user) is evaluated using the assessment. The comparative assessment may be performed iteratively and/or in a structured manner (e.g., such that pairs with a same number of components are evaluated prior to evaluating pairs with a different number of components).

The pair-wise quantitative comparative assessment can include, for example, generating a similarity metric using the representative messages and determining whether the metric exceeds a threshold metric (e.g., that is predefined, a default number of identified by a user). The similarity metric may be based on (for example) whether the representative messages include a same (or similar) number of components, number of variable (or non-variable) components, content of each of one or more non-variable components, characteristic (e.g., format, character type or length) of one or more variable components, and so on. The similarity metric may be based on generating a correlation coefficient between the inter-cluster messages or by performing a clustering technique using a larger set of messages to an extent to which representative messages of the clusters are assigned to a same cluster or share components (e.g., if a technique includes using a component analysis, such as principal component analysis or independent component analysis.

Clustering performed at cluster stage 313 may be performed based on (for example) user input corresponding to at least a partial definition of a rule (e.g., that indicates one or more variables or variable types that are to be characterized as variable or that identifies two or more clusters or types of clusters that are to be merged into a single cluster). Clustering performed at cluster stage 313 can further or alternatively be performed based on one or more rules that are fixed or at least party generated based on a learning protocol (e.g., learning based on grouping inputs received in association with a particular client or all clients). Clustering performed at cluster stage 313 can be performed, e.g., in response to detecting a new rule, subsequent to storage of initial clusters, or at predefined times or time intervals. In some instances, performance of cluster stage 313 is conditioned upon detecting that a predefined condition is satisfied, which may depend on initial clustering. For example, a predefined condition may be satisfied when a number of initial clusters exceeds a predefined threshold, when a number or percentage of initial clusters to which less than a predefined number or percentage of log messages was assigned exceeds a predefined threshold, when a statistic (e.g., median, average, maximum, or minimum) of a number or percentage of log messages assigned to each cluster is below a predefined threshold, etc.

In some instances, clustering performed at cluster stage 313 includes merging one or more first clusters into a second cluster, such that an identifier of the first cluster(s) is changed or mapped to an identifier of the second cluster. In some instances, clustering performed at cluster stage 313 includes merging two or more clusters into a new cluster, such that an identifier of each of the clusters is changed or mapped to an identifier of the new cluster. A cluster identifier can include (for example) a numeric identifier and/or a text identifier (e.g., name, which may be defined based on user input).

In the "normalize" stage 314, the identified fields are normalized. For example, a "time" field may be represented in any number of different ways in different logs. This time field can be normalized into a single recognizable format (e.g., UTC format). As another example, the word "error" may be represented in different ways on different systems (e.g., all upper case "ERROR", all lower case "error", first letter capitalized "Error", or abbreviation "err"). This situation may require the different word forms/types to be normalized into a single format (e.g., all lower case un-abbreviated term "error").

The "transform" stage 316 can be used to synthesize new content from the log data. As an example, "tags" can be added to the log data to provide additional information about the log entries. As another example, a tag may identify a cluster to which a log message is assigned.

A "condition evaluation" stage 318 is used to evaluate for specified conditions upon the log data. This stage can be performed to identify patterns within the log data, and to create/identify alerts conditions within the logs. Any type of notifications may be performed at this stage, including for example, emails/text messages/call sent to administrators/customers or alert to another system or mechanism. As one example, a condition may define an event that corresponds to a change in cluster assignments, such as detecting that a quantity (e.g., number or percentage) of log messages assigned to a given cluster has exceeded a threshold (e.g., that is fixe and pre-defined or defined by a user, a client or rule), such as being below a lower threshold or above an upper threshold. As another example, a condition may define an event that corresponds to a degree to which a quantity of log messages being assigned to a given threshold is changing, such as by identifying a threshold for a slope of a time series or a threshold for a difference in counts or percentages or log message assigned to the cluster between two time bins. As yet another example, a condition may define an event that corresponds to multiple cluster assignments, such as an event that indicates that a time series of each of the multiple clusters has a similar shape (e.g., by determining whether curve-fit coefficients are similar enough to be within a threshold amount, by determining whether a time of one or more peaks in time series are within a defined threshold time, determining whether a correlation coefficient between time series of the clusters exceeds a threshold, and/or determining whether a difference between a variability of a time series of each of the individual clusters and a variability of a sum of the time series exceeds a threshold value).

A log writer 320 then writes the processed log data to one or more data stores 324. In some embodiments, the processed data is stored within both a text/indexed data store (e.g., as a SOLR cluster) and a raw and/or historical data store (e.g., as a HDFS cluster). The log writer can also send the log data to another processing stage 322 and/or downstream processing engine.

Figure 3B:
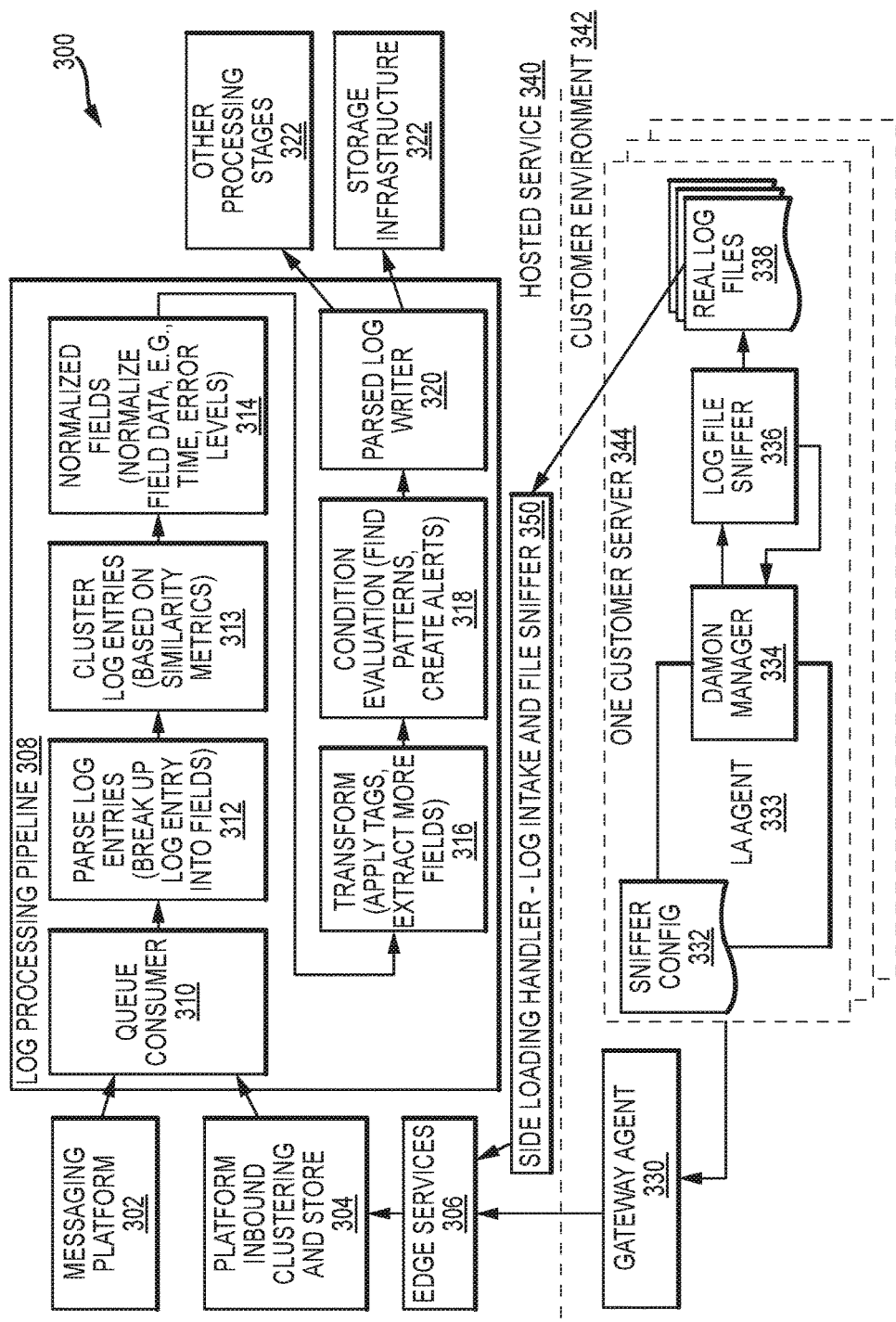
Figure 3C:
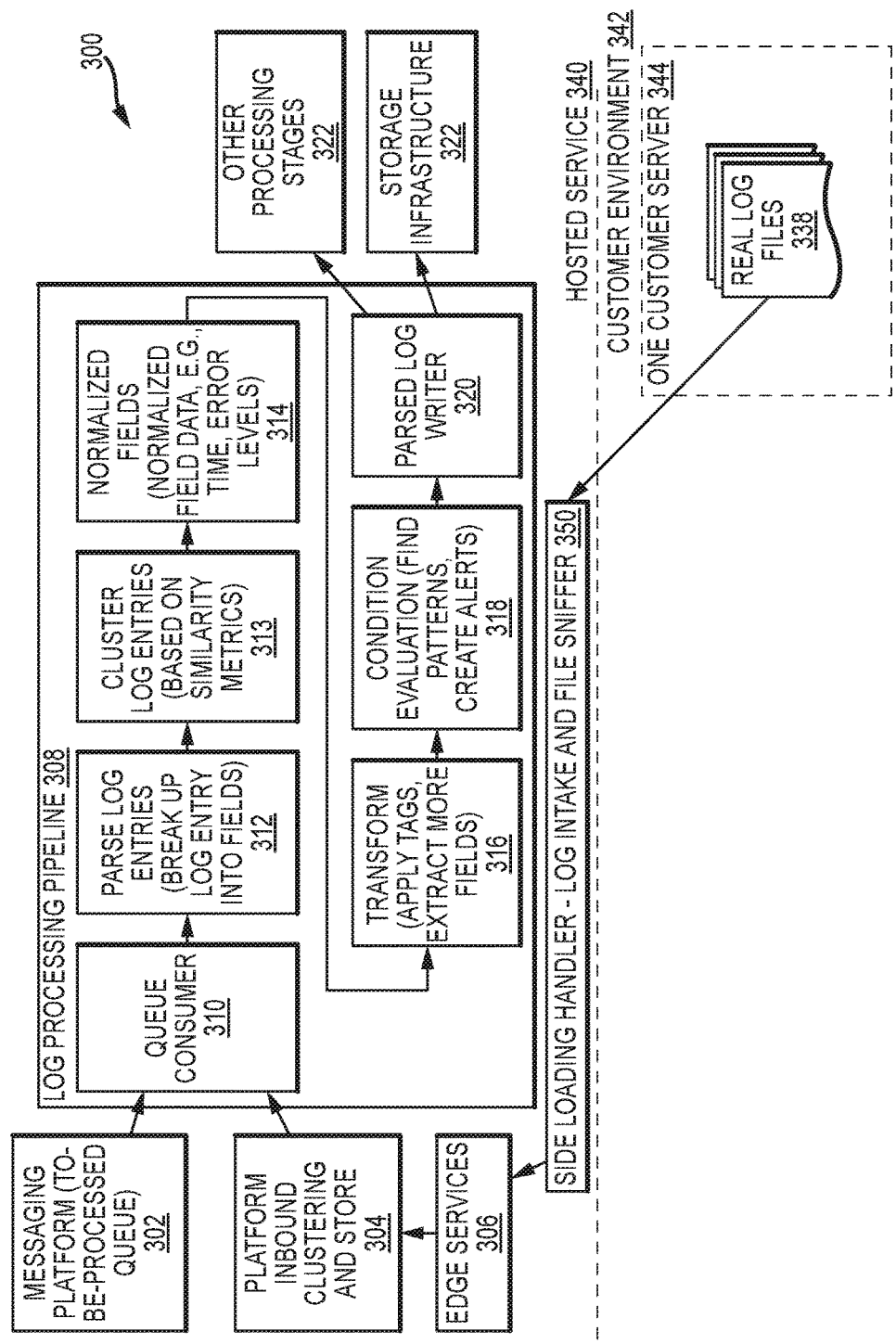

As shown in FIG. 3B, some embodiments provide a side loading mechanism 350 to collect log data without needing to proceed through an agent 333 on the client side. In this approach, the user logs into the server to select one or more files on a local system. The system will load that file at the server, and will sniff through that file (e.g., by having the user provide the log type, attempting likely log types, rolling through different log types, or by making an educated "guess" of the log type). The sniffing results are then passed to the Edge Services and process as previously described. In the embodiment, of FIG. 3C, only the side loading mechanism 350 exists to gather the log files—where the agent/sniffer entities are either not installed and/or not needed on the client server 344.

Figure 4:
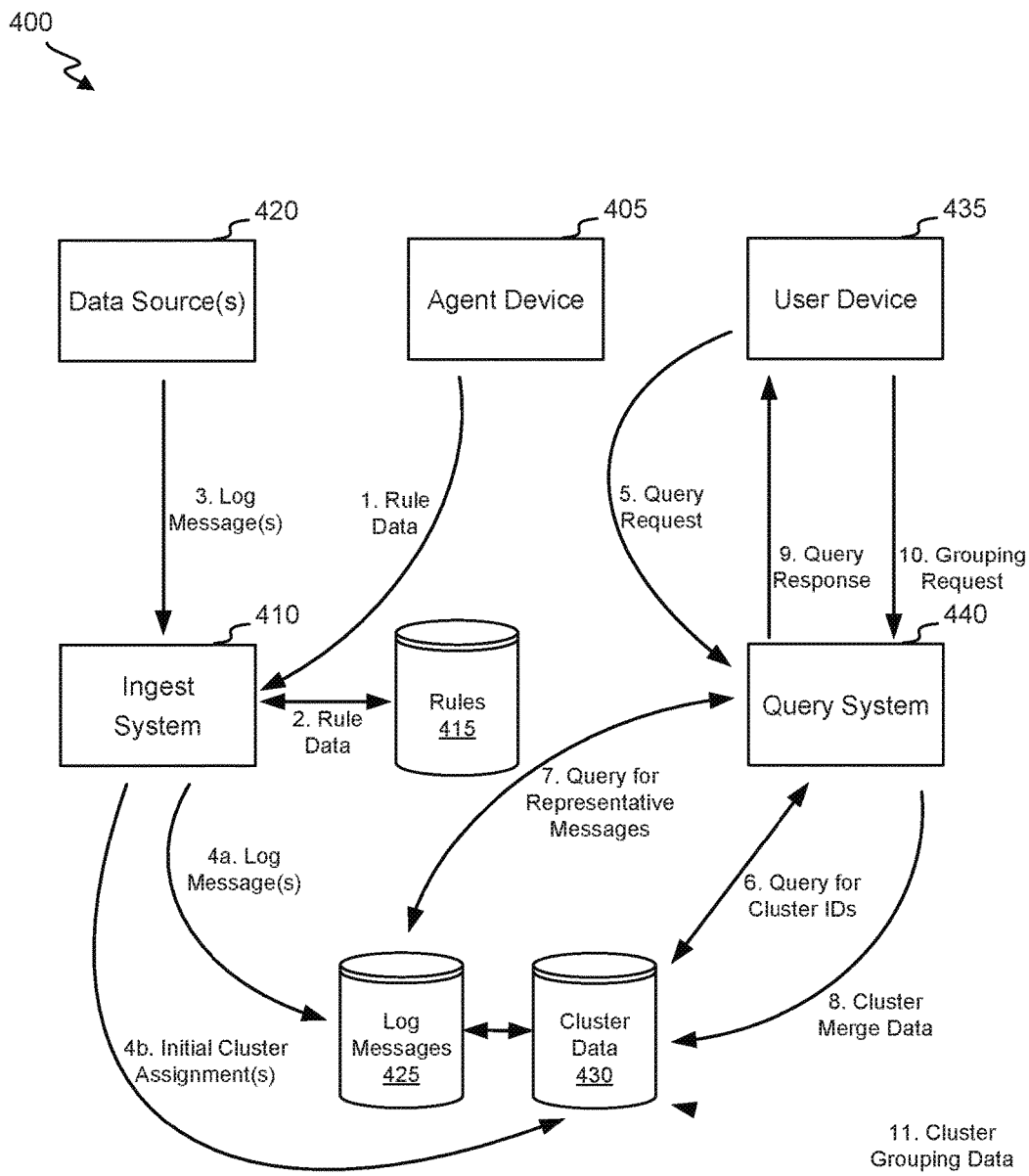
FIG. 4 shows an exemplary of a communication series clustering and grouping log messages according to some embodiments.

FIG. 4 shows an exemplary of a communication series 400 for clustering and grouping log messages. At a first action of series 400, an agent device transmits rule data to an ingest system. The rule data may indicate, for example, data that at least partly defines an alert condition, such as a threshold for a number, percentage, or change in number or percentage of log messages assigned to a given cluster that is to trigger generation and transmission of an alert. Agent device 405 can correspond to (for example) a client from which log messages are being received and/or a client to which data corresponding to log messages is being provided.

At a second action, ingest system 410 stores rule data in a rules data store 415. Rules data store 415 may include (for example) a table or other data structure that identifies one or more conditions. The table or data structure may identify a distinct action (e.g., alert communication) that is to be performed in response to detecting satisfaction of each condition, or two, more or all conditions may result in performing a same action (e.g., as defined in the table or data structure or otherwise identified). Ingest system 410 can subsequently retrieve rules data to (for example) define or identify one or more alert conditions, identify a target or source for log messages, and so on. For example, ingest system 410 (or another component shown in FIG. 4) may periodically retrieve one, more or each condition from the table to evaluate log-message data (e.g., cluster-assignment data) to determine whether any (and/or which) conditions are satisfied. Condition evaluation may be performed synchronously, as new log messages are received and/or clustered or asynchronously (e.g., at defined time periods).

At a third action, ingest system 410 can receive one or more log messages from one or more data sources 420. The one or more log messages may include unstructured or semi-structured data. In some instances, a schema of the one or more log messages may not be available to a ingest or query system.

Figure 5:
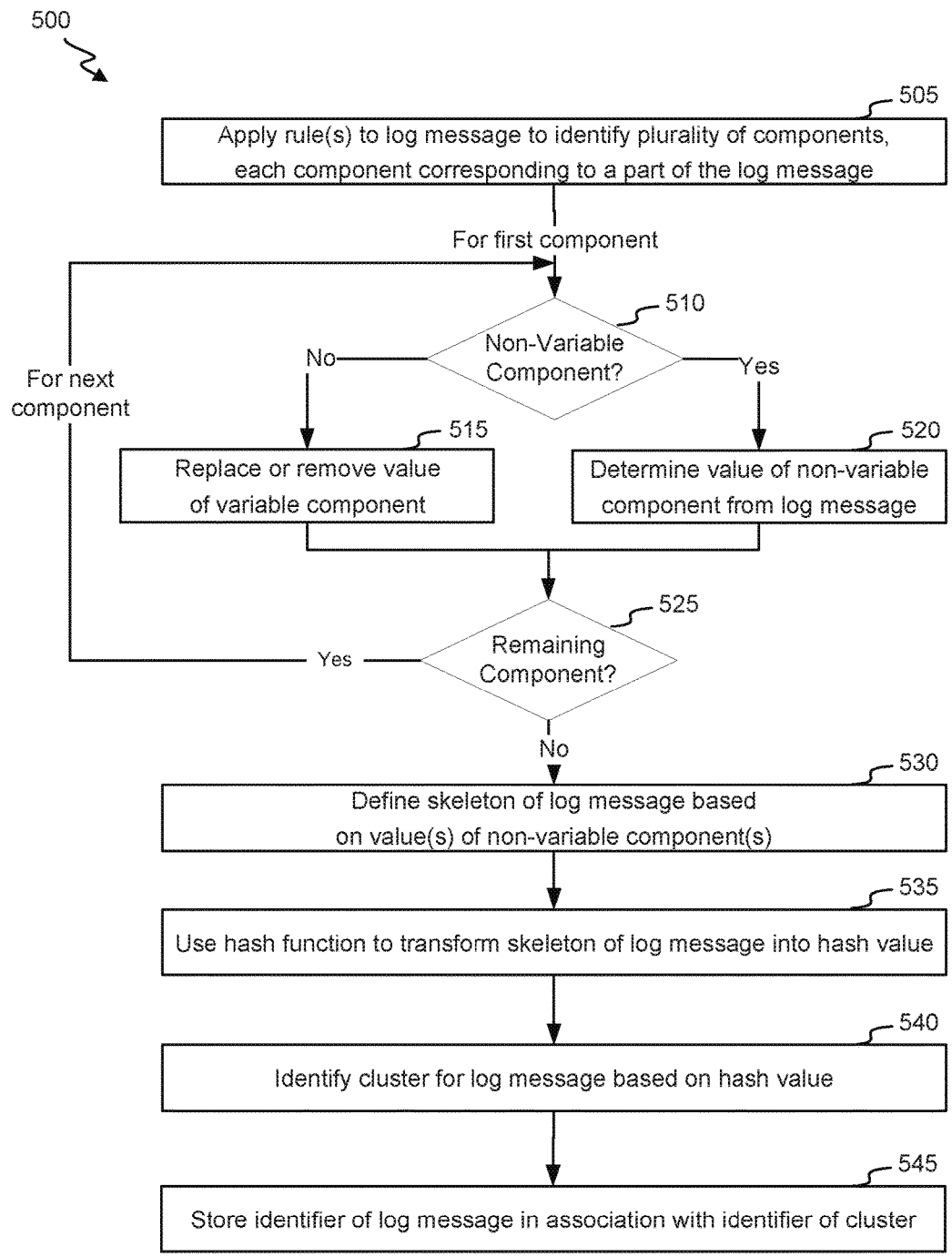
FIG. 5 shows an exemplary process for assigning a log message to an initial cluster according to some embodiments.

Ingest system 410 can identify, for each of the one or more log messages, an initial cluster to which the cluster is to be assigned. An initial cluster for a log m may be determined based on one or more non-variable components of the log message. FIG. 5 shows an exemplary process 500 for assigning a log message to an initial cluster. At block 505, one or more rules are applied to the log message to identify a plurality of components for the log message. Each component can correspond to a part of the log message. For example, it may be assumed that a log message includes a value for each of a plurality of components. If a schema or format for the log message is not immediately known, the one or more rules can be used to parse the log message so as to identify each value. Each value can then be subsequently processed to (for example) generate an estimate whether the value corresponds to a non-variable component (e.g., a field name or header data) versus a variable component (e.g., representing a particular event) and/or what particular type of component to which the value pertains (e.g., host name, status indicator, network identifier, etc.).

In some instances, the plurality of components are non-overlapping, such that any given part of the log message is not associated with more than one component. The one or more rules can include a rule defined, at least in part, by agent device 405 (e.g., to be applied to log messages from one or more identified data sources). The one or more rules can alternatively or additionally include, a grammar rule, a rule that indicates how to detect delimiters (e.g., that separate components), a rule that indicates how to detect particular types of components (e.g., a URL component or key component via types of characters or a specified string), and so on.

A first component of the log message can then be evaluated at block 510 to determine whether the component is a variable component or a non-variable component. A variable component can include a component that has a value that differs across log messages in a cluster and/or that includes a value for a variable or field (e.g., as opposed to a value that identifies a field or variable type). For example, a component that identifies an IP address, host name, timestamp or URL may be a variable component. A non-variable component can include a component that has a value that is the same across log messages in a cluster. For example, field names may be a non-variable component. The determination can be based on one or more rules (e.g., defined by a client, learned using a machine-learning technique or fixed), which may be the same or different than the one or more rules used at block 505. The determination can be based on (for example) what types of characters are in the value for the component in the message (e.g., where a combination of letters and numbers may result in a determination that the component is variable) and/or whether the value for the component includes any human-language words (e.g., which may result in a determination that the component is non-variable).

When it is determined that the component is a variable component, process 500 continues to block 515, where a value of the non-variable component can be deleted or replaced from a temporary version of the log message. For example, the value may be replaced with data identifying a type of data (e.g., alphanumeric, numeric, categorical, etc.) for the value or with a placeholder data element (e.g., [ ] or . . . ). Such data replacement can preserve information indicating where, within a log message, a variable-component value is located without retaining the value itself.

When it is determined that the component is a non-variable component, process 500 continues to block 520, where a value for the non-variable component is determined using the log message. For example, the value may be identified from the log message.

At block 525, it is determined whether there are any remaining components for which block 510 has not yet been performed. If so, process 500 continues to block 510, and the next component is assessed. If not, process 500 continues to block 530 where a skeleton of the log message is defined. The skeleton can be defined to include a value (determined at block 520) for each non-variable component and to omit a value for each variable component. For example, a skeleton may include a modified version of the log message where a value for each variable component is replaced with data identifying a type of data or a placeholder data element, or where a value for each variable component is deleted from the message.

At block 535, a hash function is used to transform the skeleton of the log message into a hash value. A hash function can include (for example) any function that consistently maps a skeleton to an identifier that is unique to the skeleton (as compared to other identifiers to which other skeletons are mapped). For example, a hash function can include a hash table, where the skeleton can be used to look up an index; a checksum function; Pearson hashing; etc.

At block 540, a cluster is identified for the log message based on the hash value. Block 540 can include identifying, for example, an identifier for a cluster. In some instances, the identifier is the same as or includes the hash value. In some instances, the hash value is used to look-up the identifier for the cluster. The cluster may be associated with cluster data, such as an indication as to which and/or how many other log messages were assigned to the cluster, one or more rules (e.g., alert rules) to be applied to the cluster, and/or definitions as to meaning of particular components.

At block 545, an identifier of the log message is stored in association with an identifier of the cluster. This storage can correspond to assigning the log message to the cluster. The identifier of the log message can be stored in association with an identifier of the cluster by, for example, tagging the log message with the identifier, updating a table or array to associate a unique identifier of the log message with the cluster identifier, and/or adding an identifier of the log message to a data structure (e.g., record) corresponding to the cluster.

In the exemplary representation of FIG. 4, ingest system 410 sends the log message(s) to a log message data store 425 and the initial cluster assignment(s) (e.g., associating an identifier of the log message with an identifier of a cluster) to a cluster data store 430 at a fourth action. For example, raw log messages may be stored in log message data store 425, and a mapping of a unique identifier of each log message to an identifier of a cluster can be stored in cluster data store 430.

In some instances, one or more cluster assignments may be modified at a time subsequent to ingest. For example, the modification may occur in response to detecting a new merging rule that indicates that two or more particular clusters are to be merged together into a single cluster or that two or more types of clusters are to be merged together into a single cluster. The merging rule may be generated in response to a request from a user (or agent) to define the rule and/or in response to a learning protocol that generates the rule in response to detecting previous manual merging of such clusters. In some instances, a merging rule corresponds to an indication that a particular variable is to be considered variable, such that each cluster separated only based on differences between values for the particular variable are merged.

At a fifth action, a user device 435 can transmit a query request to a query system 440. The query request may, but need not, include one or more particular constraints. In some instances, the request corresponds generally to receive analytics corresponding to log messages associated with a particular client.

At a sixth action, query system 440 can query cluster data store 430 to identify a set of unique cluster identifiers, such as to identify each identifier of an initially assigned cluster (e.g., associated with a client) or each identifier of any cluster (e.g., associated with the client). In some instances, the sixth action includes translating an API call corresponding to the query request into one or more backend cluster commands implemented at via a query-language intermediate layer. The backend cluster commands can initially retrieve data in parallel using multiple threshold from one or more data sources (e.g., in a plurality of different files in a plurality of different machines or hosts). The backend commands may identify one or more constraints from the query so as to retrieve a specific set of machine-generated data records (e.g., log records). Each machine-generated data record can be processed to identify (e.g., at a device that manages or is close to the storage) a corresponding skeleton or cluster. Query-responsive skeleton data can be transmitted to a coordinating device to identify a representative log message and/or evaluate potential merging.

Query system 440 can then query log message data store 425 to identify, for each cluster, one or more representative log messages assigned to the cluster. In some instances, a fixed number of log messages (e.g., 1 log message or a number as defined by a client) is selected for each cluster. In some instances, a number of representative messages identified for a cluster depends on a factor, such as how many messages are in the cluster and/or in another cluster.

Query system 440 can use the retrieved data (e.g., representative messages or cluster assignments) to determine whether any clusters are to be merged together. In some instances, a condition is evaluated to determine whether a number of clusters exceeds a predefined threshold, whether a number of log messages assigned to a cluster is below a predefined threshold, or whether a minimum, maximum, average or median number of log messages assigned to each cluster is below a predefined threshold. When the condition is satisfied, a merging protocol may be implemented. The merging protocol may include (for example) combining clusters which users previously provided input corresponding to a merging instruction (e.g., at least a threshold number or percentage of times). The merging protocol may include identifying one or more components that account for a highest degree of variability across the clusters and merging clusters differing based on values of the one or more components. The merging protocol may include applying a clustering protocol, such as a protocol that uses: a component analysis (e.g., PCA or ICA), a machine-learning clustering algorithm, a connectivity-based clustering algorithm, a distribution-based clustering algorithm, a centroid-based clustering algorithm or a density-based clustering algorithm.

In some instances, query system 440 iteratively or concurrently performs comparison processing made for a pair of initial clusters and determines whether the pair are to be merged. For example, the comparison processing can include generating a similarity value based on the values in the message and determining whether the similarity value exceeds a pre-defined threshold.

In some embodiments, the similarity value corresponds to the degree of overlap between one or more first representative log messages and one or more second representative log messages. The comparison processing can further or alternatively be performed using a tokenization approach, where a given log message is broken into multiple components or "tokens". For example, a tokenization process may generate tokens for a log message by detecting delimiters of the log message and identifying tokens of the message as being content separated by successive delimiters (and/or the start or end of the message). Any suitable delimiter can be used to tokenize the log message. For normal textual data, the delimiter may be, for example, spaces or new lines. Other types of data may use different delimiters. For example, URL-based data may use symbols such as "/" or "\" as a delimiter. In certain tokenizers, one might decide not to split tokens within quotes, or to collapse multiple white spaces and use them as a single delimiter.

In the context of tokenized log data, the similarity value may pertain to the degree of overlap between two log messages in terms of "token count", "token content" and/or "token position". Token count pertains to a number of tokens in the log message. Token content pertains to the content of individual tokens and/or combinations of multiple tokens. Token position pertains to the relative location, presence, and/or absence of particular tokens within the log data. In general, the similarly value is higher when two sets of log data have higher levels of correspondence for token count, token content, token positions, and/or a combination of token content and positioning, whereas the similarly value is lower when there is less correspondence between the two sets of log data for these items.

For a given set S of representative messages, the approach in some embodiments performs classification/grouping by finding a representative message vector V for a first initial cluster and creating a new group G.

A similarity value is then calculated between V and a log message vector for each of other initial cluster in S. Any suitable approach can be taken to implement the similarity value that corresponds to a measure of the degree of overlap between the vectors, corresponding to the level of differences and/or similarities between the vectors. In some instances, a comparison processing for determining a similarity value compares content between the two vectors using a token-based approach. For example, a similarity value may be higher when there is a match between a number of tokens in the messages, when values of corresponding tokens are of a same size or word type (e.g., numeric characters only, a string of alphanumeric characters, or natural language), and/or when values of corresponding tokens match (e.g., as may be more likely for non-variable components). As one particular example, a similarity value may include a percentage of a first representative message's tokens having a value that is an exact match to a value of a corresponding token in a second representative message.

As another example, some embodiments use a "hamming distance" as the similarly value, where the hamming distance between two strings corresponds to the number of positions at which the corresponding symbols are different. The hamming distance therefore measures the number of substitutions needed to change one string into the other, and for binary strings a and b the hamming distance can be calculated by determining the number/percentage of ones from performing an XOR operation on a and b. In some embodiments, a token-based hamming approach is employed to calculate the hamming distance. It is noted, however, that other types of similarity values may also be used in place of hamming distances. For example, similarity values may be used that do not depend upon token ordering or which weight certain positions in the vector/string greater than other positions (e.g., where matching/nonmatching tokens at beginning of the string are weighted greater than tokens at the end of the string).

Clusters are merged when their representative log messages have a similarity value/hamming distance that is small enough (according to the similarity threshold that is passed as input). When multiple representative log messages are associated with a cluster, the similarity assessment may include (for example) comparing each of the representative messages from a first cluster to each of the representative messages from a second cluster and calculating a statistic (e.g., median or mean) based on the similarity values, which can be compared to a threshold.

At this point, a signature is generated for the merged cluster, which can be a form of regular expression that describes all the messages in the merged cluster. Further a count can be made of the number of messages in the merged cluster. These actions can be repeated until (for example) each potential merge of initial clusters is considered.

Figure 6:
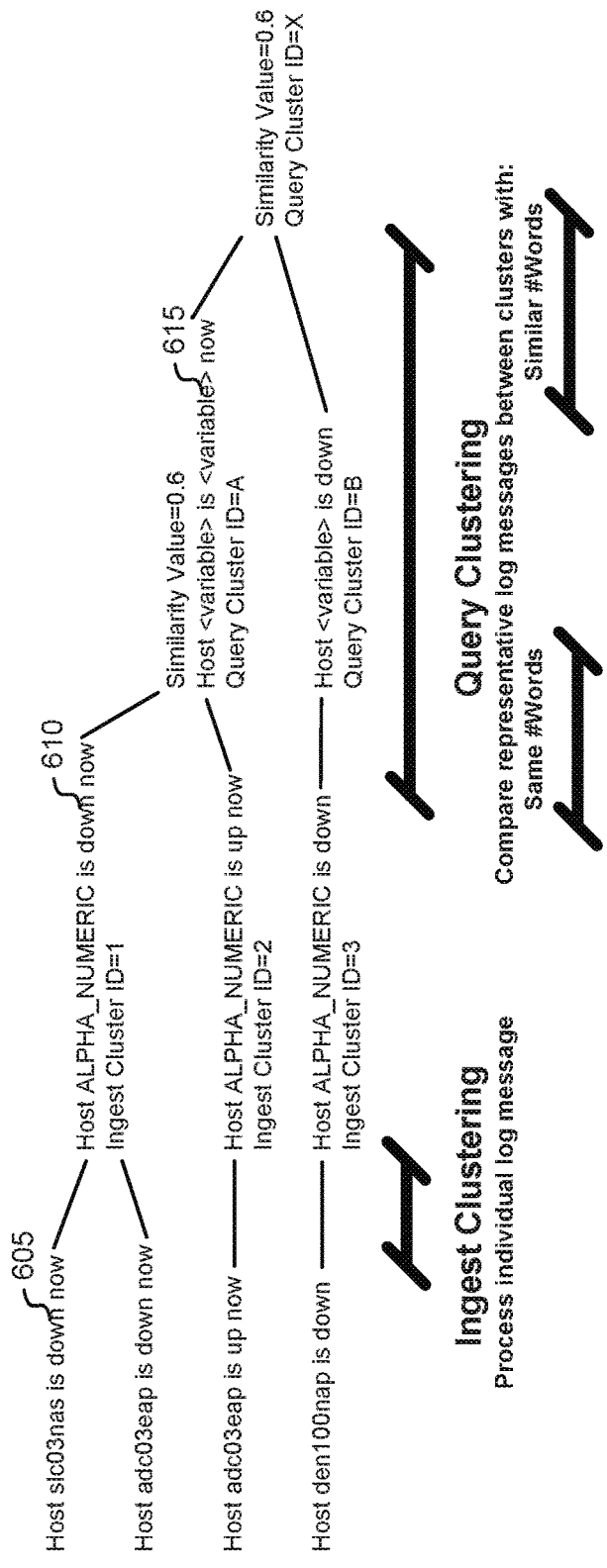
FIG. 6 illustrates one example of a multi-stage clustering process according to some embodiments.

FIG. 6 illustrates one example of a multi-stage clustering process, of which a first stage can be performed by ingest system 410 to determine initial clusters and one or more subsequent stages (in the depicted instance, a second and third stage) can be performed by query system 440 to evaluate potential merging of clusters. In this example, 4 log messages 605 are shown. At an ingest stage, each message can be broken into components, which can (in this instance) correspond to words in the message. Thus, it can be determined that there are five components in the first three messages and four in the third. Also at the ingest stage, a rule that assesses character types can be used to determine that each component is non-variable, except for the second word (e.g., "slc03nas"). The variable components can be replaced with a component-type indicator ("ALPHA_NUMERIC") to generate a message skeleton 610 for each message. Each of the first two messages corresponds to a same skeleton. A hash function can be applied to each skeleton to generate an Ingest Cluster ID. Because the first two messages correspond to a same skeleton, they also are assigned to a same ingest cluster, which is different than the ingest clusters to which the third and fourth messages are assigned.

In the depicted instance, a particular type of clustering based on similarity values is performed at query time. It will be appreciated that different types of subsequent processing may additionally or alternatively be performed. It will also be appreciated that subsequent clustering (e.g., based on similarity values or of another type) may be performed after ingest but before a query (e.g., at a predefined time or in response to detecting a new rule). It will further be appreciated that the depicted similarity-based query clustering (or any other subsequent processing) may be conditionally performed (e.g., in response to detecting an above-threshold number of clusters responsive to a query or a number of statistic of log messages assigned to a cluster that is below a threshold).

In the depicted instance, at query time, representative messages from various clusters can be compared to generate a similarity value to determine whether the clusters are to be merged. The comparison may first compare clusters that have a same number of components or "words". Thus, here, initially a representative message from Ingest Cluster 1 (e.g., "Host slc03nas is down now") can be compared to a representative message from Ingest Cluster 2 (e.g., "Host adc03eap is up now"). A comparison processing can include identifying a percentage of components for which one representative message has a same value as does another representative message. Thus, here, a similarity value can be 0.6. This value may be above a defined threshold, which would indicate that Ingest Clusters 1 and 2 are to be merged. A skeleton of the merged cluster 615 is shown to indicate how the merged cluster has more variable components than the corresponding ingest clusters.

Subsequently, clusters with different numbers of components can be compared. For example, a representative message from Cluster ID A (e.g., "Host slc03nas is down now") can be compared to a representative message from Cluster ID B (e.g., "Host den100nap is down"). Thus, here, a similarity value can be 0.6 given the illustrative representative messages. This value may be above a defined threshold, which would indicate that Ingest Clusters A and B are to be merged.

Returning to FIG. 4, query system 440 can transmit cluster merge data to cluster data store 430 at an eighth action. The cluster merge data may identify an identifier of each of multiple clusters and indicate that the multiple clusters are to be merged. In some instances, a new identifier is assigned to the merged cluster. Cluster data store 430 can then be updated to reflect the cluster merging, such as by re-associating each log message assigned to one, more or any of the clusters to be merged to a new cluster (e.g., reassigning messages from a first cluster to a second cluster to which it will be merged, or reassigning messages from each of the first and second clusters to a third cluster). In various instances, subsequently ingest system 410 may continue to assign new messages to an initial cluster or, when appropriate, may automatically assign it to a merged cluster. It will further be appreciated that, in some instances, a query-time subsequent clustering may be selectively applicable only to the query, for queries having a particular characteristic and/or for a particular client. Thus, in some instances, the eighth action may be omitted and merge data need not be stored.

Figure 7A:
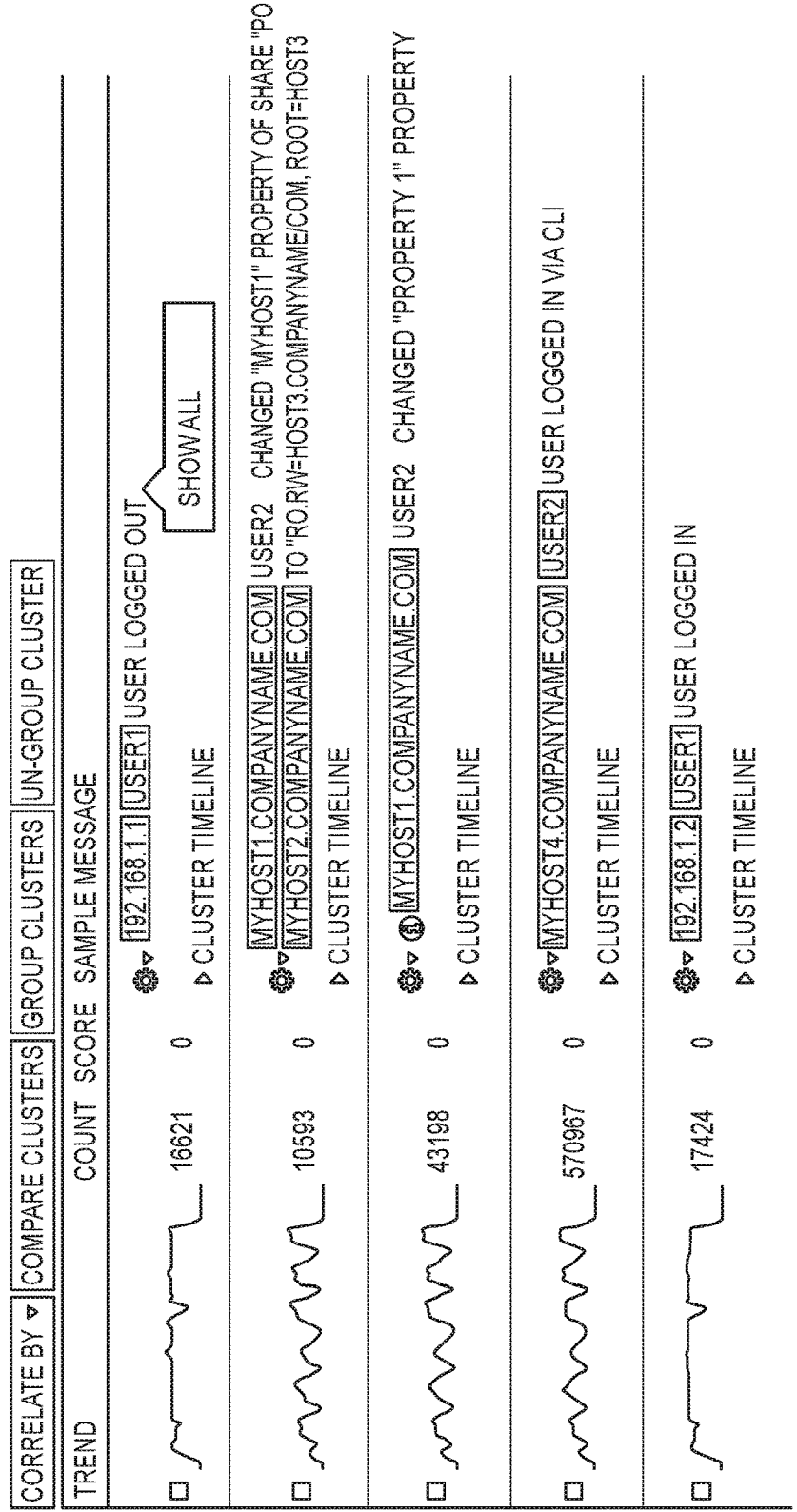

At a ninth action, query system 440 transmits a query response to user device 435. For example, a query-language intermediate layer or backend result can be translated into an API result. The translation may include inserting one or more values into a GUI template and/or configuring one or more input options (e.g., to facilitate exploration of log messages in a data set). In some instances, the query response is configured to facilitate a presentation at a user device that includes data corresponding to each of a set of clusters (e.g., associated with a given client). FIG. 7A shows an example presentation. The set of clusters may reflect any merging that has occurred. The presentation can identify, for each of the set of clusters, a number (or "count") of log messages assigned to the cluster and/or a time series for the cluster. The time series can include data that indicates, for each of multiple (e.g., sequential) time bins, a quantity (e.g., number or percentage) of log messages with a timestamp in the bin and that were assigned to the cluster. The time series can be generated by, for example, querying log message data store 425 and/or cluster data store 430 with an identifier of a cluster to identify a timestamp of each log message assigned to the cluster. The timestamp may include (for example) a time (e.g., which may include a date) on which the message was generated, at which an event represented in the message occurred, at which the message was transmitted from a data source, and/or at which the message was received at ingest system 410. A set of time bins can be defined, with each bin having a start time and an end time. The time series value for each bin can correspond to a number of log messages assigned to the cluster and having a timestamp between the start and end times. In some instances, the number may be normalized (e.g., by a total number of messages assigned to the bin across clusters). The time bins for the time series can be evenly spaced and have a fixed duration.

The presentation can also or alternatively identify, for each of the set of clusters, one or more representative messages for the cluster or parts thereof. In some instances, a full representative log message is presented to represent each of one, more or all clusters. Each representative message may be presented so as to indicate which component(s) of the message were identified as being variable (or non-variable). In the depicted instance, values of variable components are highlighted. In some instances, for each of one, more or all clusters, a value for each variable component from a representative log message is presented.

The presentation can be interactive and configured to receive input, via an interactive option (e.g., a button or link corresponding to a cluster and/or message component), that will cause the presentation to be updated to include other information corresponding to a cluster. Such other information may include, for example, one or more other log messages assigned to the cluster and/or one or more other values of a variable component. In the example depicted in FIG. 7A, the representation of the value for each of the variable components includes a link. Selection of a link for a variable component can cause the presentation to be updated to include data corresponding to which other value(s) were observed in the cluster for the variable cluster and/or distribution data for each value.

Figure 7B:
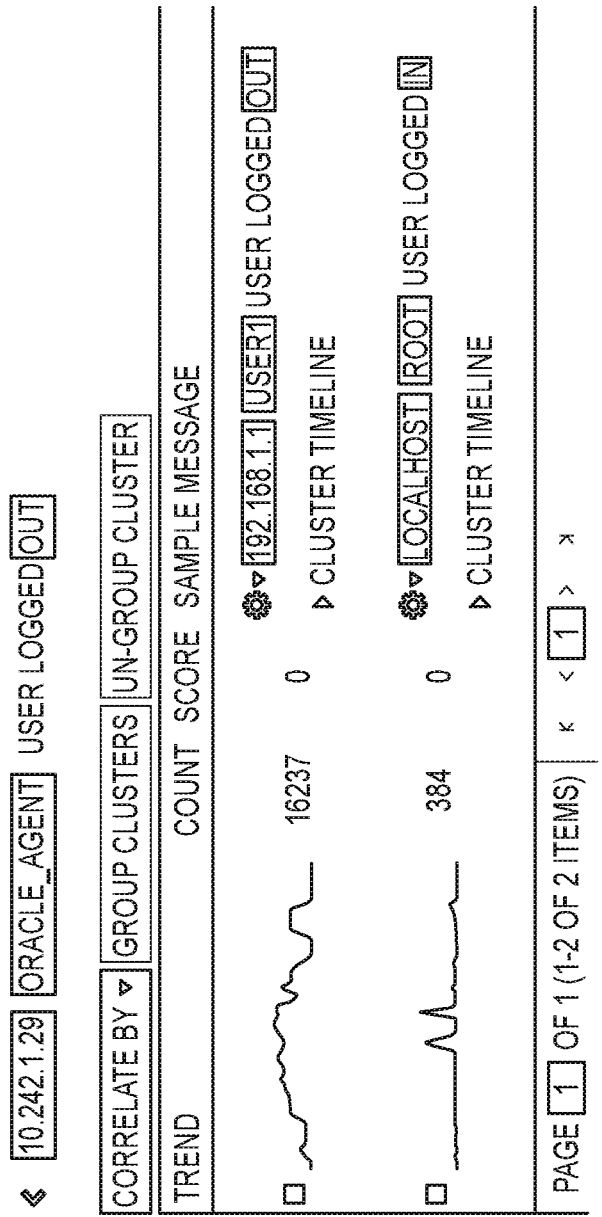
Figure 7C:
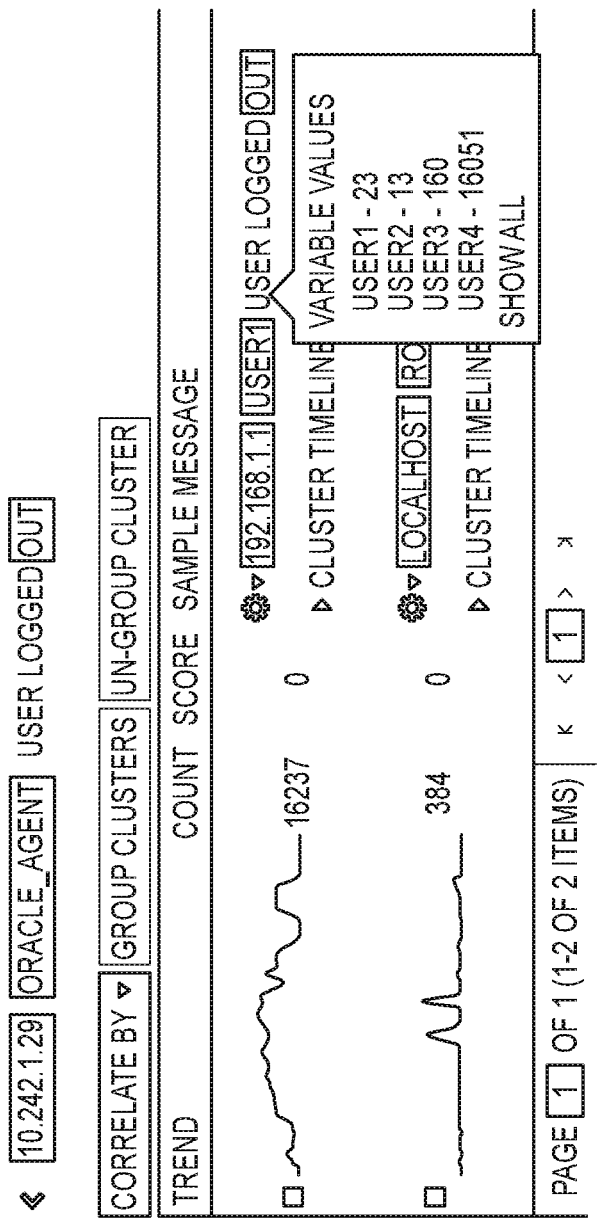

For example, FIG. 7B shows an example presentation of an updated interface presented in response to user input corresponding to a selection of the "out" variable of the first representative message in FIG. 7A. FIG. 7B indicates that, for this particular variable component, two values were represented in the cluster: "out" or "in". The count column indicates that 16237 messages in the cluster included the "out" value, while only 384 included the "in" value. A representative log message is shown for each value, and a time series is further presented that indicates how many messages with the corresponding value had timestamps within various bins.

The updated interface can enable a user to further drill down into log data for the cluster. For example, in this instance, an input such as hovering over a value of a variable component (e.g., server name) or clicking on the value may again cause presentation of one, some or all other values for the variable component that are included in log messages in a subset of the cluster corresponding to the "out" value of the initially selected variable component. In the depicted instance, four other values are shown, though selecting a "Show All" option can cause each other value to be identified. Thus, presentation of cluster data through an interactive interface with representative log messages can allow a user to explore messages, values, and components in the cluster to understand the underlying data set.

An interface may further include an option that receives input corresponding to a request to group multiple clusters together. For example, the option can accept one or more inputs to identify the multiple clusters (e.g., by checking boxes or buttons next to representations of the clusters, by identifying them by name (FIG. 7D), or by sequentially clicking on row representations of the clusters). In some instances, a query response and/or interface may further identify suggested groupings or grouping "hints". For example, a clustering protocol performed prior to or at a query-processing time (e.g., based on similarity values, variation assessments, centroid-based protocols, density-based protocols, etc.) may identify multiple clusters to potentially group. As another example, grouping recommendations may be generated based on an assessment of a time series representing temporal occurrences of timestamps of messages assigned to a cluster (and/or of one or more time series of messages assigned to one or more other clusters). For example, a grouping recommendation may be provided in response to detecting that a first cluster subsided (e.g., ended or decreased in prevalence) at a time corresponding to a time at which a second cluster began (e.g., or increased in prevalence). The assessment may include, for example, performing a correlation assessment (e.g., to determine whether a correlation coefficient between time series of multiple clusters exceeds an upper threshold representing cluster alignment or is below a lower threshold representing cluster evolution), performing a pattern analysis (e.g., to determine whether events or other messages that preceded or coincided with messages of a first cluster were similar to events or other messages that preceded or coincided with messages of a second cluster, and so on).

A representation of each of the multiple clusters (e.g., including a representative log message and/or values of each variable component in a representatives machine-generated data record) can be presented along with an indication corresponding to a recommendation to group the clusters. As another example, a result of a clustering protocol may indicate that it may be advantageous to re-characterize a particular component as being a variable component. A corresponding recommendation may be presented on an interface along with an input option that, if selected, will cause clusters distinguished only based on differences between the particular component to be grouped.

Figure 7E:
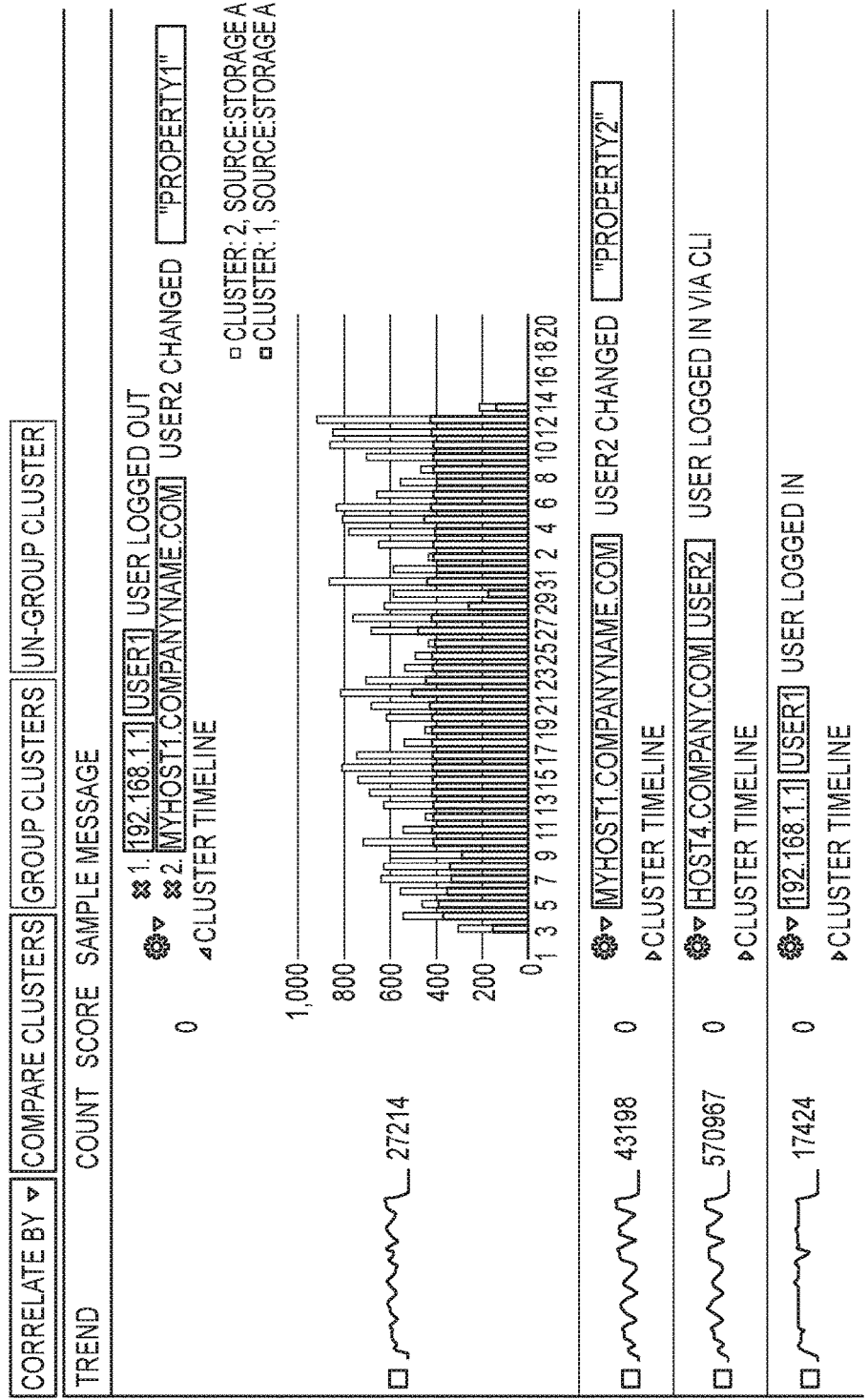

Receiving grouping input can trigger generation of new statistical data that corresponds to a set of log messages, each log message having been assigned to any of the grouped clusters. FIG. 7E shows an exemplary interface with data corresponding to grouping input. Here, a message count corresponds to a sum of message counts in the clusters included in the grouping. Further, a single graph is displayed that presents time series for the data. In this instance, the single graph includes a stacked bar graph, where bars from one cluster are represented with a different color than bars from another cluster. The stacking of bars further indicates temporal patterns that correspond to the total group. It will, however, be appreciated that other types of graphs are contemplated (e.g., a grouped bar graph, a normalized stacked bar graph, a pie chart void of time-series information, etc.) and other types of cluster representations are contemplated (e.g., representing each cluster with a different pattern).

Returning to FIG. 4, at a tenth action, user device 435 can transmit a grouping request to query system 440. The grouping request can identify or be indicative of each of multiple clusters and correspond to a request that the clusters be grouped. The grouping request may further include a name for the group. In some instances, query system 440 provides real-time statistics and data for the group in response to a preliminary request, and establishment of a request requires a confirmation indication. In some instances, any grouping request is effected until an ungrouping request is received. When a grouping request is to be effected, query system 440 sends cluster grouping data to cluster data store 430 that identifies the multiple clusters and indicates that they are to be grouped. The grouping may affect, for example, responses to subsequent queries, automated reporting (e.g., of cluster data), evaluation of alert conditions, and so on.

In some instances, at least some clustering data is stored in a data cache. For example, initial cluster assignments, cluster merging data and/or cluster grouping data may be stored in a data cache. The data may be stored for a predefined period of time. If the data is used and/or verified within the period of time, the data may remain in the cache for a longer time (e.g., restarting the predefined period of time) and/or may be stored in permanent storage. For example, if a user indicates that multiple clusters are to be grouped together, identifiers of the multiple clusters may be cached along with a grouping indication for a period of time. If a query is received within the period of time for which two or more of the multiple clusters satisfy the query constraints, a result of the query may be returned with a hint to potentially group the clusters. If the user accepts the hint, thereby providing an instruction to proceed with the grouping, the cached data may be transferred to persistent storage (e.g., and used as a merging rule or persistent hint) and/or be stored in the cache for an additional duration of time.

In some instances, cluster-merging and/or cluster-grouping data (e.g., that identifies two or more clusters that are to be or were merged or grouped together) is conditionally cached or stored. For example, the data may be stored or cached when (e.g., and only when) a merging or grouping corresponds to at least a predefined number of clusters and/or in response to receiving a request from a user for the merging or grouping to persist (e.g., always, for a given type of query, for a given client, for a defined time period, and/or for a present session).

In some instances, initial clusters are automatically merged together in accordance with cluster-merging or cluster-grouping data when a number of clusters identified in response to a query exceeds a predefined threshold. A presentation of a result of the query may indicate that a corresponding merged or grouped result corresponds to a merging or grouping of clusters and may further be associated with an input option that, when selected, identifies (e.g., via a representative message) each cluster that had been merged together.

Cluster-merging and/or cluster-grouping data can identify multiple initial clusters that are to be merged or grouped together. Thus, in some instances, the data can be used to even detect that subsequently received log messages are to be included in a merged cluster or cluster group (e.g., by identifying an initial cluster and by using the cluster-merging and/or cluster-grouping data to detect that the initial cluster is to be merged or grouped).

In one embodiment, a user interface provides an option for a user to elevate a particular combination/pattern (or multiple specified combinations/patterns) of variable and/or non-variable parts to a top-level cluster of the analytics platform. Once elevated, the particular combination would appear as a separate cluster even though the particular combination might have otherwise been present in another cluster. Once the particular combination has been elevated, in one embodiment, the particular combination may be excluded from any other cluster(s) that it would have otherwise fallen under, the exclusion occurring at ingestion time and/or at query time. In another embodiment, the particular combination may still be included in the other clusters that it would have otherwise fallen under, but the particular combination is also represented as its own cluster. Whether or not to exclude particular combinations from other clusters at ingestion time and/or at query time may also be a user-configurable setting. Elevating particular combinations of variable and/or non-variable parts to a top-level cluster of the analytics platform allows a user to place higher emphasis, visibility, and importance on specific log messages that would have otherwise been several layers deep in a drill-down menu.

The particular combination may include specific non-variable parts but exclude other specific non-variable parts. For example, the particular combination may include a wildcard character in place of certain non-variable parts but specific keywords for other non-variable parts, such as "WARNING: SERVER * IS DOWN," where "WARNING: SERVER", and "IS" are non-variable parts that identify the particular combination and "DOWN" is a variable part that identifies the particular combination. As another example, the particular combination may include placeholders that place constraints on value formats without placing constraints on the particular values. For example, the particular combination may be "WARNING: SERVER [HOSTNAME] IS DOWN" or "WARNING: SERVER AT [IP ADDRESS] IS DOWN," where "[HOSTNAME]" is a placeholder for an string that identifies the server that is down, or "[IP ADDRESS]" is a placeholder for an IP address that identifies the server that is down. The IP address placeholder may have constraints requiring a certain number of numerals in certain locations along with a certain number of periods, such as "###.###.#.#".

As shown above, the particular combination may fix certain variables but leave other variables flexible. Once a user has drilled down on an interface by fixing values for certain variables without fixing values for other variables, the user may select an option such as "make this a separate cluster," in which case the settings of which variables are fixed and which variables are not fixed is preserved along with the non-variable skeleton. The user may edit this cluster by replacing some of the variable and/or non-variable parts with wildcards or placeholders that have type restraints, such as the one above. In the same or a different embodiment, the user may specify the particular combination as a query. The query may search for messages that have certain variable and/or non-variable parts as specified.

Regardless of whether the particular combination is specified as a query, a skeleton, a partial skeleton with placeholders, a partial skeleton with wildcards, or a full message, log items currently satisfying the particular combination and/or streaming log messages that later satisfy the particular combination are then added to a cluster for the particular combination. In one embodiment, specifying that the particular cluster should be identified at the time of ingest pushes the particular combination out to data ingest logic that is using a deterministic function to determine cluster identifiers for messages, for example, by hashing. The data ingest logic may pull out the particular combination before or after the cluster identifiers are initially determined, or in parallel, asynchronously with determining the cluster identifiers. Once the particular combination has been detected and pulled out, the data ingest logic assigns a unique cluster identifier that is shared by messages matching the particular combination. In one embodiment, the particular combination may be mapped by the data ingest logic to the various other clusters that result from applying the deterministic function to the messages or representations thereof. For example, there may be 3 different clusters that could possibly include messages that satisfy the particular combination, and an additional synchronous filter (i.e., applied serially, message by message or for sets of messages, with the initial clustering at the time of ingest) may be applied to those clusters (but not to other clusters that could not possibly satisfy the particular combination). The synchronous filter may result in pulling out messages matching the particular combination into the separate cluster for the particular combination.

If the particular combination has not been pulled out at the time of data ingest, the particular combination may still be pulled out at or before query evaluation time or when the interface is otherwise being viewed or browsed. In that scenario, log analytic interface logic may pull out the particular combination before or after log messages are identified as being parts of their respective cluster(s), or in parallel, asynchronously with identifying the messages in the cluster(s). In one embodiment, the particular combination may be mapped by the log analytic interface logic to the various other clusters that result from applying the deterministic function to the messages or representations thereof. For example, there may be 3 different clusters that could possibly include messages that satisfy the particular combination, and an additional synchronous filter (i.e., applied serially, message by message or for sets of messages, with at the time of retrieving messages for display in the log analytics interface) may be applied to those clusters (but not to other clusters that could not possibly satisfy the particular combination). The synchronous filter may result in pulling out messages matching the particular combination into the separate cluster for the particular combination. In this embodiment, the particular combination is not stored in the same way as the other clusters that resulted from the deterministic function that was applied to the messages or representations thereof. Nonetheless, to the user, the particular combination appears in an interface along with the top-level clusters before the user has drilled down into the clusters by selecting to fix certain variable parts in a query session, drill-down session, or other navigational session (such as a back-and-forth inquiry that starts at top-level clusters and ends when the user either ends the inquiry or returns to top-level clusters thereby starting a new inquiry).

Though not explicitly shown in FIG. 4, ingest system 410 can monitor incoming log messages and determine whether an alert condition is satisfied, so as to initiate transmitting an alert communication. The alert condition can be, for example, defined within a rule (stored in rules data store). Thus, the alert condition may be at least partly defined based on (for example) a default configuration, a communication from agent device 405 and/or an assessment of previous log messages (e.g., to identify an abnormal characteristic or pattern, such as by using a machine-learning technique or pattern-detection technique). The alert condition may, but need not, be particular to (for example) a client and/or one or more data sources.

The alert condition can define a type of event that is to trigger an alert. An event may indicate that log messages may be being assigned to wrong clusters, that multiple clusters should be merged, or that there is a problem with a system for which log messages pertain. The type of event can correspond to a change in cluster assignments of log messages (e.g., initial cluster assignments or cluster assignments after having been subsequently processed to determine whether and/or which clusters are to be merged). Thus, to determine whether an event has occurred, ingest system 410 may periodically (e.g., at routine intervals) query cluster data store 430 to determine a quantity of log messages being assigned to each cluster and/or to generate (or retrieve) time-series data for each cluster.

For example, an event can include detecting that a quantity (e.g., number or percentage) of log messages assigned to any given cluster, a particular cluster, or one or more particular clusters has exceeded an upper threshold (or fallen below a lower threshold). As another example, an event can pertain to a change in a quantity of log messages being assigned to a given cluster, such that a change in assignments that are above an upper threshold or below a lower threshold may trigger an alert. To illustrate, detecting that a value of a number of messages assigned to a cluster or a derivative of a number of messages assigned to a cluster is above a first predefined threshold (e.g., zero or some number that is greater than zero) may indicate that a new cluster is detected and/or detecting that a value of a number of messages assigned to a cluster or a derivative of a number of messages assigned to a cluster is below a second predefined threshold may indicate that a cluster is subsiding or has ended. As yet another example, an event can pertain to multiple clusters, such as one that indicates that a time series for two clusters has a similar shape or a complementary shape (e.g., as detected via execution of a shape comparison algorithm). This type of inter-cluster time-series event may be characterized by (for example) a lower threshold on a correlation coefficient, an upper threshold on a difference between fit parameters for each of the clusters' time series, and/or a lower threshold on a slope of a fit of data points comparing (for multiple time bins) one cluster's time-series values to the other cluster's time-series values. As another example, time series of each cluster may be assessed (e.g., continuously, periodically or on request) to detect an above- or below-threshold change (e.g., in general or relative to an empirical pattern). When such a change is detected, it can be determined whether another similar or opposite change (e.g., corresponding to a same threshold, opposite threshold or different threshold) was detected at a same time (e.g., and/or within a defined temporal tolerance).

When an event is detected, ingest system 410 can generate an alert communication that includes information about the event. The information can include an identification of one or more clusters (e.g., a numeric or alphanumeric identifier, a representative log message, and/or a name previously identified by a user) associated with the event (e.g., via a cluster identifier and/or representative log message). The alert communication may also indicate what type of event was detected and/or which alert condition was satisfied. The alert communication may further or alternatively include a time series for each of the one or more clusters associated with the event that indicates a quantity of log messages being assigned to the cluster as a function of time. As one example, an alert communication identifies a particular cluster (e.g., via a representative message and/or one or more values corresponding to a value of each variable component in a representative message) and further indicates that the particular cluster is subsiding (e.g., in response to detecting that a particular cluster lacks any messages corresponding to time stamps occurring within a time interval that is predefined or set based on past temporal patterns for the cluster) or that indicates that the particular cluster is new (e.g., in response to detecting that a threshold number of assignments for the cluster has been exceeded, such as detecting that a first assignment has been made for a given cluster). The alert communication may identify (e.g., via a representative message and/or representative component values) each of one, more or all clusters. The alert communication may include an option to merge two or more of the identified clusters.

In some instances, an event indicates that assignments to a given cluster (e.g., from a particular device or system and/or in association with a given cluster) have increased with respect to a defined time period (e.g., beyond a threshold number and/or by an amount beyond a threshold difference) and/or decreased (e.g., below threshold number and/or by an amount less than a threshold difference). The threshold may be defined based on (for example) input from a user or agent and/or previous data. The threshold may vary across clusters (e.g., such that a threshold can be set based on past patterns for particular clusters) and/or may be fixed. The threshold may vary depending on a type of cluster being considered. For example, for an alert condition configured to detect a new cluster, detection of a single log message assigned to a new cluster based solely on one or more grammar rules may correspond to satisfying the condition, but a higher threshold may be used for other types of clustering.

In some instances, one or more temporal characteristics for a cluster can be identifies, such as a peak frequency corresponding to timestamps of messages assigned to the cluster, a power at the peak frequency, a variance (or standard deviation) of the peak frequency and/or a variance (or standard deviation) of power. A threshold may be defined based on the temporal characteristic(s). For example, a threshold corresponding to a "cluster-ending" alert may be defined as detecting that a peak frequency of messages has changed to be less than ⅓ of the peak frequency and/or less than a peak frequency minus two standard deviations of the peak frequency.

Upon detecting such an event, an alert communication can identify the event (e.g., "New cluster detected", "Cluster expanding", "Cluster subsiding" or "Cluster ended"), can include an identifier and/or name for the cluster, can include a representative message from the cluster and can include a time series for the cluster. The alert communication may further identify one or more other clusters having a complementary or similar change (e.g., occurring within a defined time window from the detected increase or decrease) and/or each other cluster via a cluster identifier, cluster name, representative message and/or time series.

As a particular illustration, a backend log-ingest monitor (e.g., ingest system 410) can apply one or more grammar rules (e.g., to identify each non-variable component in a message) to identify an initial cluster for a log message. A cluster data store can then be retrieved to associate an identifier of the initial cluster with an identifier of the log message. If the cluster data store does not include an identifier of the initial cluster or if a number of messages previously associated with the initial cluster is a defined number (e.g., one below a threshold), the log-ingest monitor can trigger an alerting mechanism to generate and transmit (e.g., via email, an app notification, an SMS message, a webpage pop-up or notification and so on) an alert communication that indicates that a new cluster has been detected and includes a link. Upon receiving a request for the linked page, an interface can be presented that identifies the log message and new cluster (e.g., via the log message itself and/or a skeleton for the log message). A same or different interface (e.g., one linked to at the interface) may identify one or more other clusters (e.g., associated with a change—such as an increase, decrease or departure from a previous pattern—that is beyond a threshold amount and that occurred within a defined period of time from the triggering of the alerting mechanism). Each of the one or more other clusters may be identified by name, identifier, representative message and/or skeleton. The same or different interface may include one or more options that, if selected, cause the new cluster to be grouped with at least one cluster of the one or more other clusters. Such a grouping may cause the new cluster to be associated with a same name as previously identified for the at least one cluster and can cause statistics to be generated and/or maintained based on a combination of messages assigned to the new cluster and the at least one cluster. This may be useful, for example, if the new cluster arises as a result of an upgrade, but that maintaining consistency of the cluster may facilitate execution of one or more rules and/or interpretation of statistics (e.g., across a time period spanning before and after the upgrade and/or across devices that differ in terms of whether the upgrade has occurred).

The alert communication can include or can be included within a message (e.g., transmitted via email or SMS), a webpage, or app page. The alert communication may include or may include a destination with an interactive interface. The interactive interface may identify components of messages being assigned to a cluster (e.g., as being variable or non-variable). An alert communication and/or interactive interface can potentially include a skeleton of a cluster associated with the event, which may identify a value of each non-variable component of the cluster (e.g., and a placeholder for each variable component). An alert communication and/or interactive interface can potentially additionally or alternatively include one or more representative log messages and/or one or more representative values for each cluster. The interactive interface may be configured to receive input that triggers the interface to be updated with new representative data (e.g., one or more other representative log messages or representative values). The interactive interface may further include one or more controls, which may indicate that a cluster is to be split into two clusters (e.g., reversing a merge) and/or that two clusters are to be merged.

In some instances, a detection protocol can be defined to detect a log message corresponding to a particular skeleton, corresponding to a particular initial cluster and/or including a particular value has been detect. The skeleton, initial cluster and/or particular value may indicate that it may be advantageous to apply a cluster-reassignment, cluster-merging, and/or cluster-grouping technique (e.g., to associate the log message with another cluster). The detection may trigger an asynchronous clustering (e.g., merging) to occur (e.g., to cause the log message to be assigned to and/or associated with a cluster as identified in the detection protocol). The detection may cause an interface presented in response to a query, for which the log message is responsive, to include a hint that it may be advantageous to group a cluster associated with the log message with another cluster.

In some instances, an alert condition is configured to detect a log message assignment to any of one or more clusters (e.g., which may include a value identifying an operational problem). The alert condition may, but need not, relate to a multiple message condition. For example, an alert condition may indicate that an alert communication is to be transmitted both when (1) a first log message identifies a particular webpage session and is assigned to a cluster that indicates that a payment process has been initiated and (2) a second log message identifies the particular webpage session and is assigned to another cluster that indicates that a payment failure has occurred. The alert condition may further indicate that a different type of alert communication is to be transmitted depending on whether a third log message is detected that identifies the particular webpage session and is assigned to yet another cluster that indicates that an order error has occurred. These different types of alert communications may be useful, as a user may want to investigate a potential fraud attempt if the failure occurs without the error but may want to investigate a potential system malfunction if the error occurs.

Systems depicted in some of the figures may be provided in various configurations. In some embodiments, the systems may be configured as a distributed system where one or more components of the system are distributed across one or more networks in a cloud computing system.

Some disclosures indicate that initial clustering (e.g., performed at ingest) can be based on grammar rules and that subsequent clustering (e.g., cluster merging performed at or before a query is received and/or cluster grouping performed after a query is responded to) can be performed based on (for example) similarity metrics, previous cluster groupings, user rules, various clustering algorithms, and so on. It will be appreciated that, in some embodiments, particular types of clusters may be performed at another stage than disclosed and/or, with respect to a given stage, one or more types of clustering may be performed in addition to or instead of those that are disclosed. For example, grammar-based clustering may be performed at an asynchronous time after ingest and before a query is received. As another example, a cluster grouping can be performed based on prior groupings (e.g., and machine learning) upon receiving a "reduce cluster numbers" request from a user after having provided a response to a query. As yet another example, a non-grammar rule can indicate that log messages having one or more characteristics (e.g., including one or specified value) are to be assigned to a particular cluster identifier, and such cluster assignment may be performed at an ingest time.

Figure 8A:
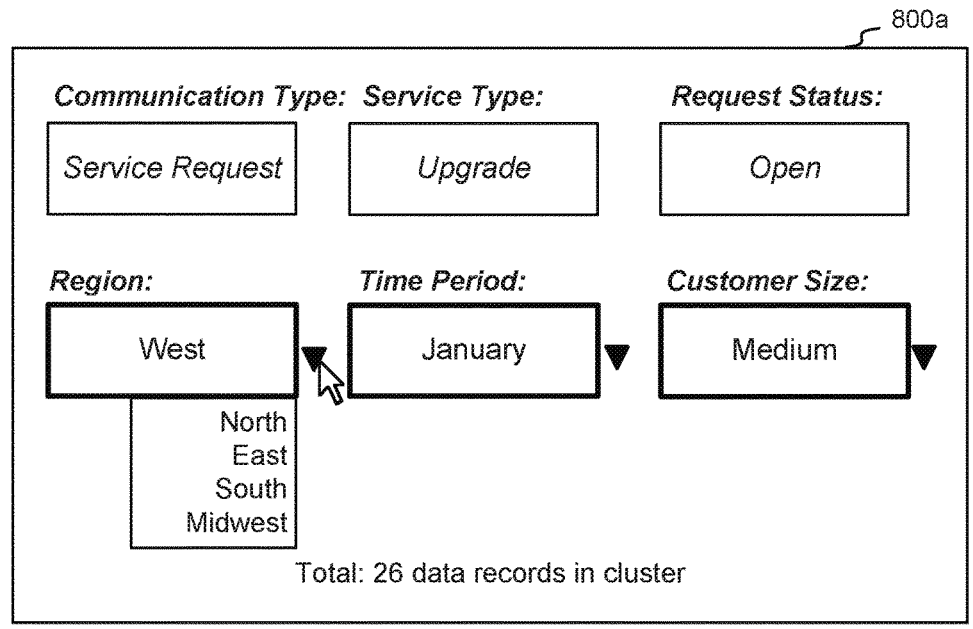
FIGS. 8A and 8B show examples of interfaces that include representative data from a representative machine-generated data record for a cluster according to some embodiments.
Figure 8B:
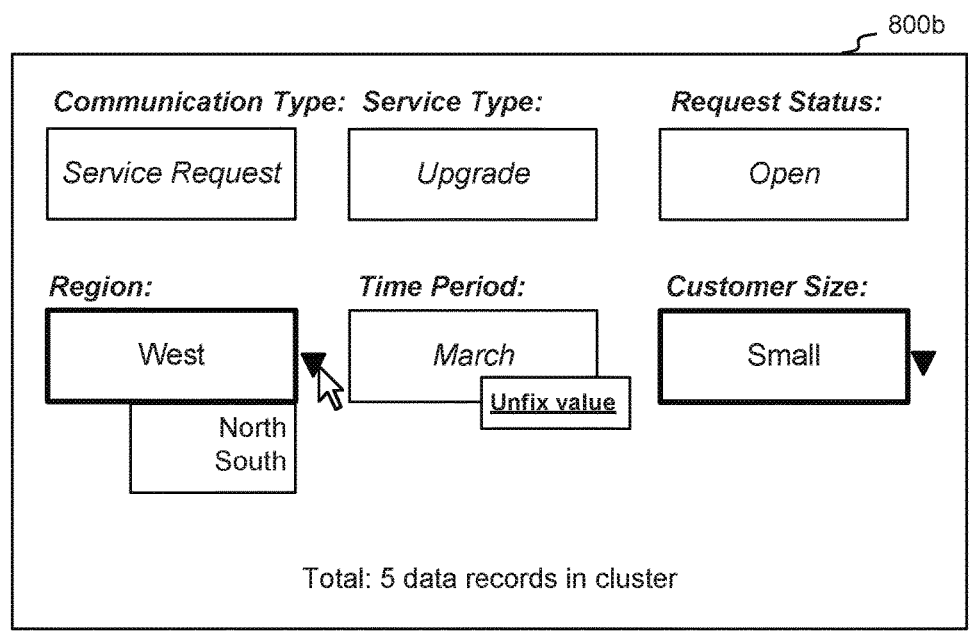

Various disclosures herein refer to processing of (e.g., detecting and characterizing components within and/or clustering) log messages and/or of representing a given cluster via a representative log message. It will be appreciated that disclosures may be extended or modified to relate to other types of machine-generated data records and/or to represent a cluster via part of a machine-generated data record (e.g., including a one or more values corresponding to one or more variable components in the machine-generated data record). FIGS. 8A and 8B show examples of interfaces that include representative data from a representative machine-generated data record for a cluster. In this example, machine-generated data records assigned to the cluster are not log messages. Rather, for example, each machine-generated data record assigned to the cluster can include a file or can include a part of an array that corresponds to one or more indices associated with the cluster.

In the depicted instance, a first interface 800*a* identifies six fields and six field values. First interface 800*a* differentially represents which components are non-variable and are variable. Specifically, the non-variable components are represented with italicized text, and the variable components are represented with non-italicized text and adjacent to a pull-down arrow. Thus, interface 800*a* indicates that all six field identifiers are non-variable components, as are the "Service Request", "Upgrade" and "Open" field values. It will be appreciated that, in some instances, an interface may be configured to only display representative values for variable components and omit representative values for each non-variable component.

Within the cluster, values for the Region, Time Period and Customer Size fields may vary across machine-generated data records. Representative data included in a presentation may be selected to ensure that at least one machine-generated data record in the cluster includes each of the presented values. Thus, at least one record in the cluster includes components identifying the West, January and Medium values.

One or more input components may be presented that allow a user to identify an alternative value for each variable component. First interface 800*a* shows a cursor having clicked on the arrow next to the West region value, which causes other values in the cluster for the same component to be displayed. A similar action may be performed with respect to the other variable components. Selection of a value may cause the value to be fixed, such that data subsequently represented in the interface only corresponds to machine-generated data records in the cluster that include the fixed value.

FIG. 8B shows a second interface 800*b* that may be presented in response to a user having changed the Time Period variable component from January to March and fixing the value. This action may change the representation of the component, such that the time period value is then represented as a non-variable component. Further, selecting a new value for one variable component may cause a value for each of one or more other variable components to be updated. The value(s) may be updated to ensure that at least one record in the cluster includes each presented value. Specifically, a subset of machine-generated data records in a cluster that include a selected value can be identified, and a representative machine-generated data record can be selected from the subset. The selection may be biased towards machine-generated data records including one or more values on a predefined prioritized list and/or towards machine-generated data records including one or more values that are prevalent across the cluster. Alternatively or additionally, a pseudo-random selection technique may be used (e.g., to select from amongst all records in the subset, from amongst all records in the subset having one or more prioritized values, and/or from amongst all records in the subset having one or more values that are prevalent in the subset.

Fixing a value for a variable component may, in some instances, further cause the interface to be updated. For example, upon fixing a value, a subset of machine-generated data records in a cluster that include a selected value may be identified, and a representative machine-generated data record can be selected from the subset. However—potentially unlike a consequence of merely selecting a value—the interface may be adapted to reflect characteristics of the subset as opposed to the initial cluster. Thus, for example, data identifying a number of machine-generated data records in the "cluster" (now subset), a time series, and so on may be updated to correspond to the subset. Further, alternative values for one or more other variable component variables may be adjusted to reflect only the values in the subset. For example, FIG. 8B represents an instance where the time period value was fixed to March. The original cluster included data elements corresponding to five regions: West, North, East, South, and Midwest. However, the subset of the cluster corresponding to the March time period only includes data elements corresponding to three regions: West, North and South. Thus, in this instance, unless a user unfixes the variable (e.g., by clicking a corresponding option or reverting to an initial cluster), the user can only select between those three regions.

It will be appreciated that the interfaces shown in FIGS. 8A and 8B are illustrative and that various other representations of values are contemplated. For example, values of non-variable components may be distinguished from values of variable components may be distinguished via font size, font type, labels, coloring, background, shading, other font style, and so on. Additionally, it will be appreciated that fixing the value may, in some instances, have caused the representation of the value to change without causing it to be the same as a representation of a non-variable component.

The interface illustrates in FIGS. 8A and 8B thus provide a presentation that characterizes values within a given cluster. The presentation includes data from a single representative machine-generated data record (though corresponding data from one or more other representative machine-generated data records could additionally be provided) so as to exemplify data values observed together. The presentation further allows exploration of other data values while continuing to modify the interface to identify data values observed together in individual records. Further, the presentation facilitates interactions to explore particular subsets of clusters.

Figure 9:
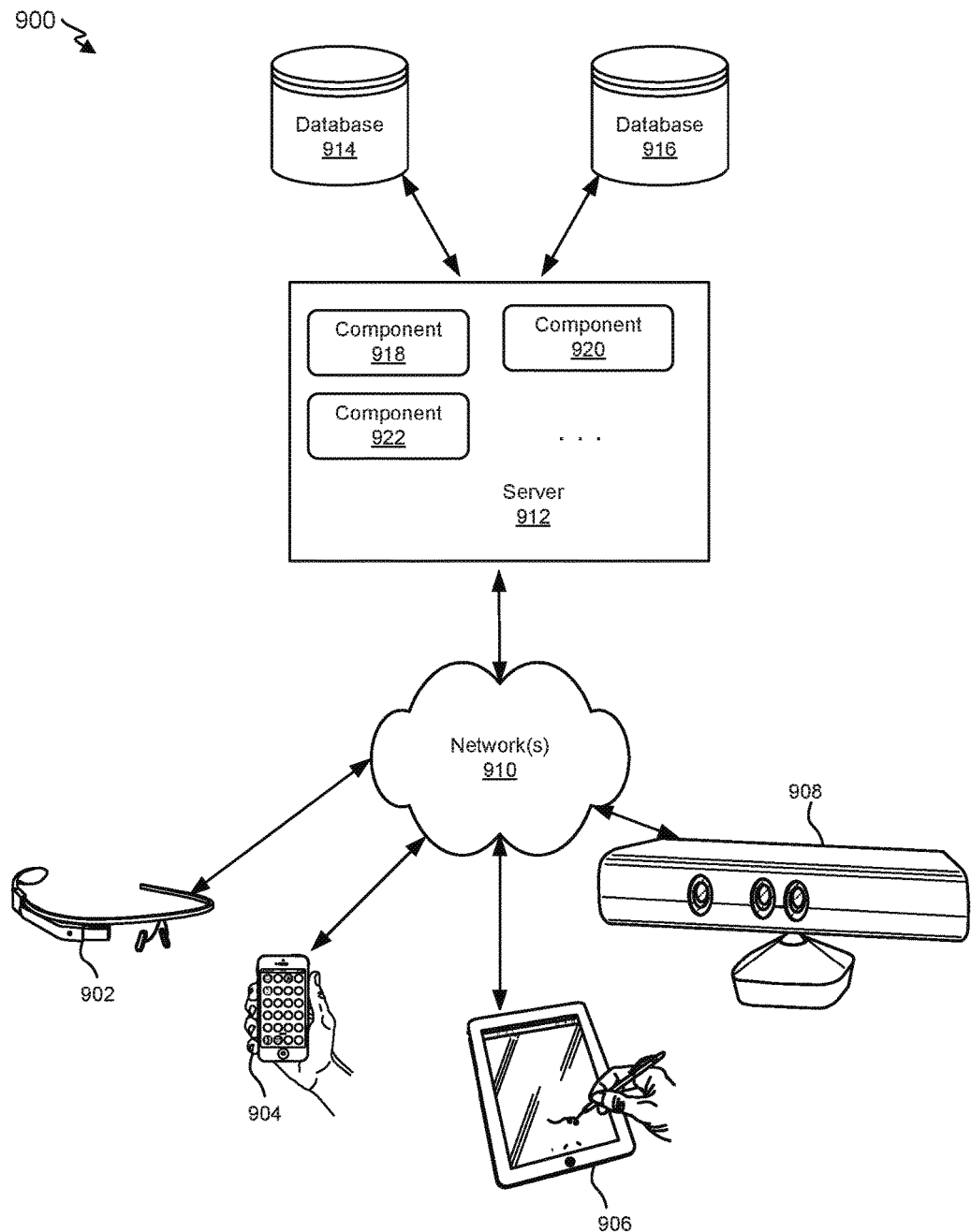
FIG. 9 depicts a simplified diagram of a distributed system for implementing some embodiments.

FIG. 9 depicts a simplified diagram of a distributed system 900 for implementing some embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
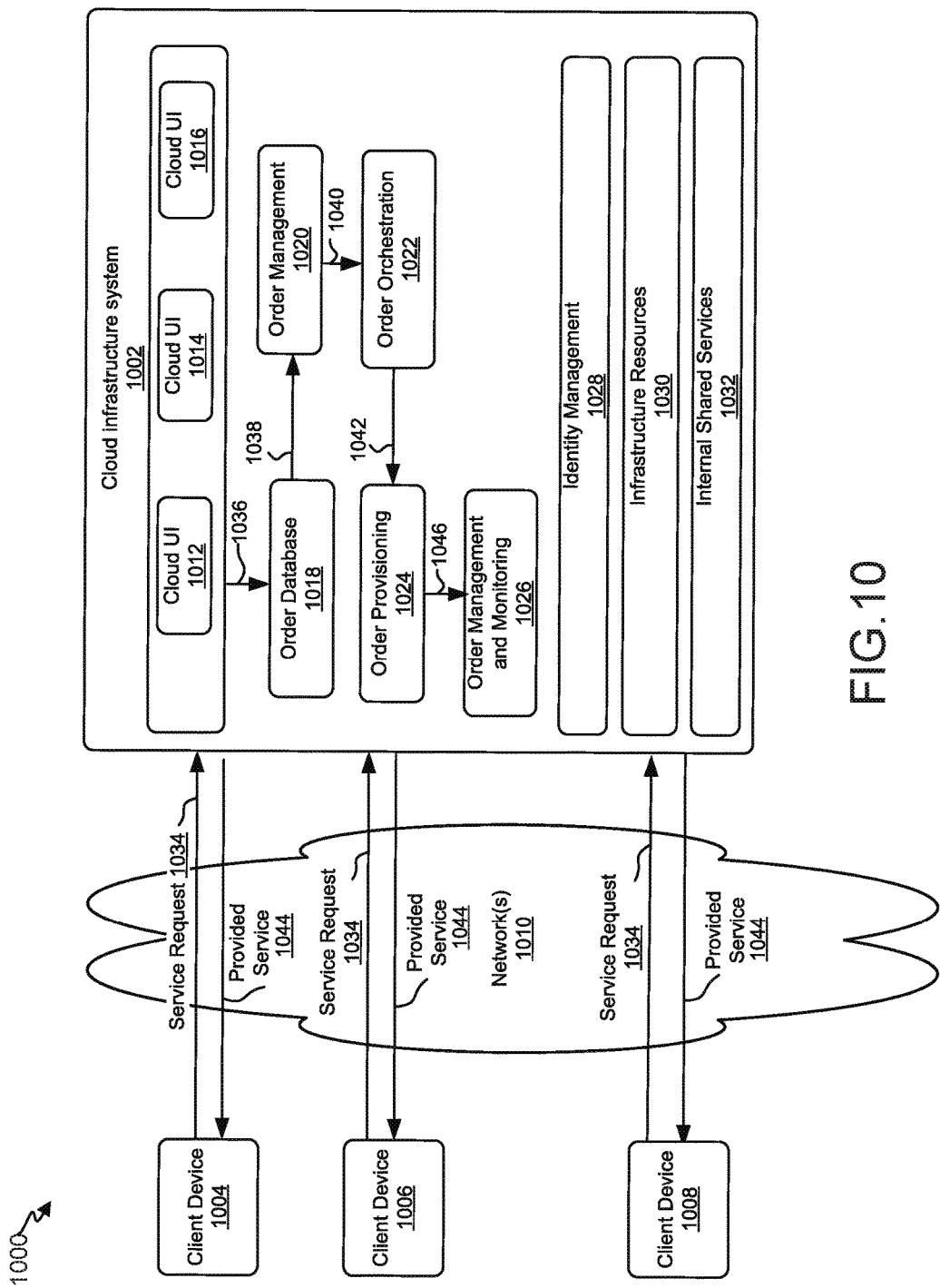
FIG. 10 is a simplified block diagram of one or more components of a system environment by which services provided by one or more components of an embodiment system may be offered as cloud services, in accordance with some embodiments.

FIG. 10 is a simplified block diagram of one or more components of a system environment 1000 by which services provided by one or more components of an embodiment system may be offered as cloud services, in accordance with some embodiments. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 910.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
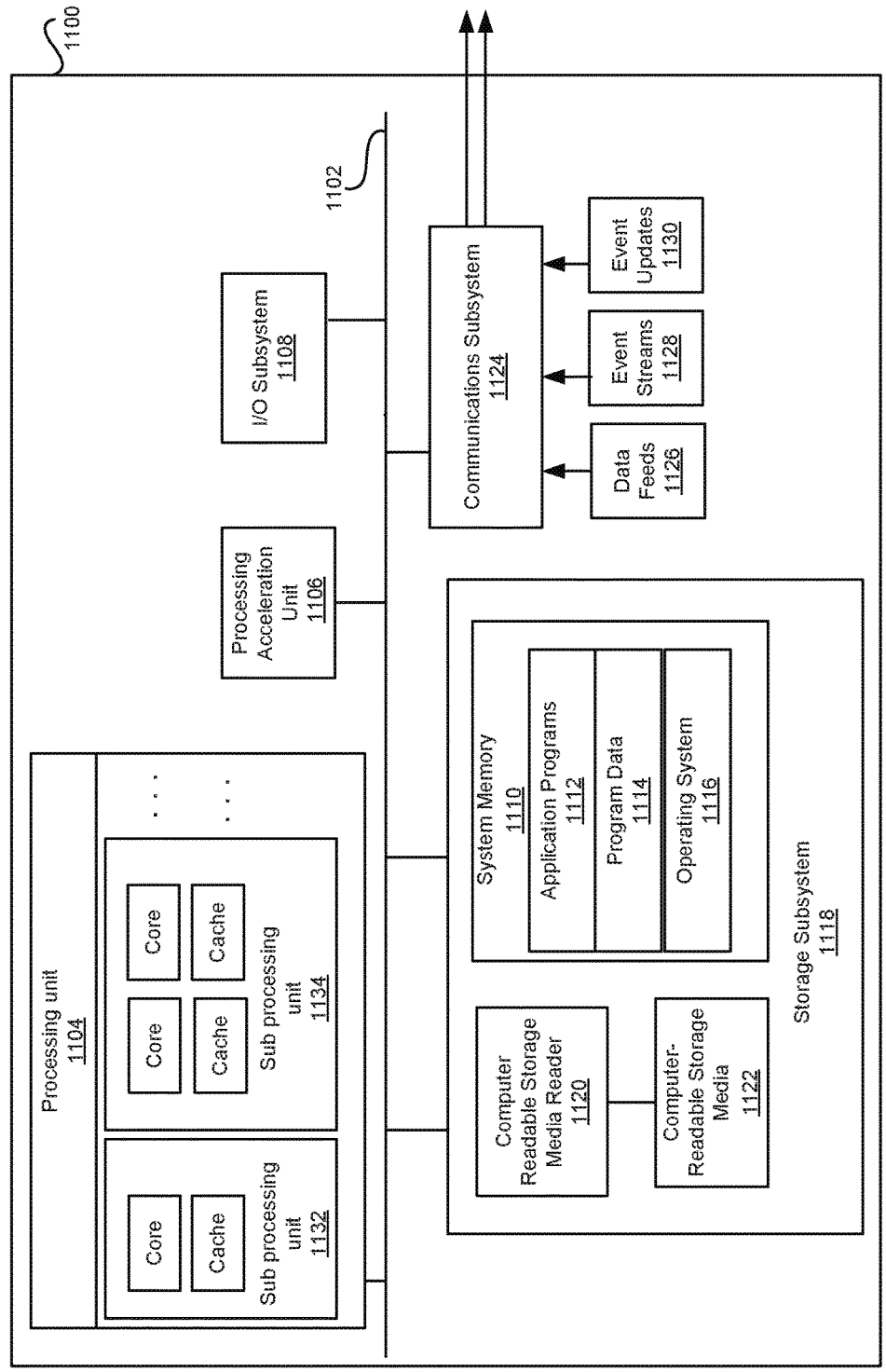
FIG. 11 illustrates an exemplary computer system, in which some embodiments of the present invention may be implemented.

FIG. 11 illustrates an exemplary computer system 1100, in which some embodiments of the present invention may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-program product tangibly embodied in a non-transitory machine-readable storage medium, including instructions configured to cause one or more data processors to perform actions including:
    receiving a log message;
    parsing the log message into a plurality of components, each component of the plurality of components corresponding to a part of the log message;
    determining, for each of one or more components of the plurality of components, a value for the component from the log message; and
    determining a cluster identifier based at least in part on:
        one or more values of the one or more components; and
        one or more rules; and
    accessing a data store that associates, for each log message of a plurality of previously processed log messages, an identifier of the log message with an identifier of a corresponding cluster, the association with the corresponding cluster indicating that the log message has one or more content-based characteristics indicative of the corresponding cluster and is assigned to the corresponding cluster, and the corresponding cluster being of a plurality of clusters;
    querying the data store with the cluster identifier;
    determining, based on a response to the query, that the cluster identifier corresponds to a new cluster;
    in response to determining that the cluster identifier corresponds to a new cluster, generating an alert communication that includes information that identifies the cluster.

2. The computer-program product as recited in claim 1, wherein:
    the data store further associates, for each log message of the plurality of previously processed log messages, the identifier of the log message with a timestamp of the log message; and
    determining that the cluster identifier corresponds to a new cluster includes:
        determining a quantity of log messages, the quantity of log messages representing the received log message and any log messages identified in the data store that are associated with a time stamp corresponding to a recent time period and with the cluster identifier;
determining that the quantity of log messages has:
increased by at least a pre-defined change threshold; or
exceeded an upper pre-defined cluster-assignment threshold.

3. The computer-program product as recited in claim 1, wherein:
the data store further associates, for each log message of the plurality of previously processed log messages, the identifier of the log message with a timestamp of the log message; and
the actions further include:
determining that another cluster is subsiding, the determining that a quantity of log messages identified in the data store that are associated with a time stamp corresponding to a recent time period and with another cluster identifier has:
decreased by at least a pre-defined change threshold; or
exceeded a lower pre-defined cluster-assignment threshold; and
in response to determining that the other cluster is subsiding, including information that identifies the other cluster in the alert communication or in another alert communication.

4. The computer-program product as recited in claim 3, wherein the actions further include:
identifying a new-cluster temporal characteristic corresponding to one or more time stamps associated with one or more log messages of the new cluster;
identifying a subsiding-cluster temporal characteristic corresponding to one or more time stamps associated with one or more log messages of the subsiding cluster; and
detecting that a that the new-cluster temporal characteristic is complementary to the subsiding-cluster temporal characteristic;
wherein, as a result of the detection, the alert communication includes data to enable input to be provided that corresponds to a request to group the new cluster with the subsiding cluster, and wherein provision of the input triggers statistical data to be generated that corresponds to a combination of a set of log messages assigned to any of the new cluster and the subsiding cluster.

5. The computer-program product as recited in claim 1, wherein the actions further include:
determining, for each component of the plurality of components, whether the component is a variable component or a non-variable component;
wherein, when the component is identified as a variable component, a cluster that identifies any messages matching the component is defined such that a value for the component is allowed to differ across log messages in the cluster while sharing a same cluster identity; or
wherein, when the component is identified as a non-variable component, a cluster that identifies any messages matching the component is defined such that a value for the component must be the same across log messages in the cluster to share the same cluster identity;
wherein each of the one or more components includes a component determined to be a non-variable component.

6. The computer-program product as recited in claim 1, wherein the actions further include:
generating a new-cluster time series for the cluster that is indicative of, for each time bin of a plurality of time bins, a quantity of log messages corresponding to the cluster identifier and having a timestamp within the time bin;
generating a different-cluster time series for a different cluster that is indicative of, for each time bin of the plurality of time bins, a quantity of log messages corresponding to a different cluster identifier and having a timestamp within the time bin;
presenting an interface that concurrently displays the new-cluster time series and the different-cluster time series.

7. The computer-program product as recited in claim 6, wherein the new-cluster time series and the different-cluster time series are displayed in a single graph.

8. The computer-program product as recited in claim 1, wherein the information includes the log message.

9. The computer-program product as recited in claim 1, wherein the actions further include, for each other cluster of one or more of the plurality of clusters:
identifying a temporal characteristic of the other cluster corresponding to one or more time stamps associated with one or more log messages of the other cluster; and
retrieving, from the data store, a representative log message for the other cluster, the representative log message being selected from amongst a plurality of log messages associated with an identifier of the other cluster in the data store;
wherein the alert communication further includes the temporal characteristic of the other cluster and the representative log message for the other cluster.

10. A computer-implemented method comprising:
receiving a log message;
parsing the log message into a plurality of components, each component of the plurality of components corresponding to a part of the log message;
determining, for each of one or more components of the plurality of components, a value for the component from the log message; and
determining a cluster identifier based at least in part on: one or more values of the one or more components; and one or more rules; and
accessing a data store that associates, for each log message of a plurality of previously processed log messages, an identifier of the log message with an identifier of a corresponding cluster, the association with the corresponding cluster indicating that the log message has one or more content-based characteristics indicative of the corresponding cluster and is assigned to the corresponding cluster, and the corresponding cluster being of a plurality of clusters;
querying the data store with the cluster identifier;
determining, based on a response to the query, that the cluster identifier corresponds to a new cluster;
in response to determining that the cluster identifier corresponds to a new cluster, generating an alert communication that includes information that identifies the cluster.

11. The computer-implemented method as recited in claim 10, wherein:
the data store further associates, for each log message of the plurality of previously processed log messages, the identifier of the log message with a timestamp of the log message; and determining that the cluster identifier corresponds to a new cluster includes:
 determining a quantity of log messages, the quantity of log messages representing the received log message and any log messages identified in the data store that are associated with a time stamp corresponding to a recent time period and with the cluster identifier;
 determining that the quantity of log messages has:
  increased by at least a pre-defined change threshold; or
  exceeded an upper pre-defined cluster-assignment threshold.

12. The computer-implemented method as recited in claim 10, wherein:
 the data store further associates, for each log message of the plurality of previously processed log messages, the identifier of the log message with a timestamp of the log message; and
 the method further includes:
  determining that another cluster is subsiding, the determining that a quantity of log messages identified in the data store that are associated with a time stamp corresponding to a recent time period and with another cluster identifier has:
   decreased by at least a pre-defined change threshold; or
   exceeded a lower pre-defined cluster-assignment threshold; and
  in response to determining that the other cluster is subsiding, including information that identifies the other cluster in the alert communication or in another alert communication.

13. The computer-implemented method as recited in claim 12, further comprising:
 identifying a new-cluster temporal characteristic corresponding to one or more time stamps associated with one or more log messages of the new cluster;
 identifying a subsiding-cluster temporal characteristic corresponding to one or more time stamps associated with one or more log messages of the subsiding cluster; and
 detecting that a that the new-cluster temporal characteristic is complementary to the subsiding-cluster temporal characteristic;
 wherein, as a result of the detection, the alert communication includes data to enable input to be provided that corresponds to a request to group the new cluster with the subsiding cluster, and wherein provision of the input triggers statistical data to be generated that corresponds to a combination of a set of log messages assigned to any of the new cluster and the subsiding cluster.

14. The computer-implemented method as recited in claim 10, further comprising:
 determining, for each component of the plurality of components, whether the component is a variable component or a non-variable component;
  wherein, when the component is identified as a variable component, a cluster that identifies any messages matching the component is defined such that a value for the component is allowed to differ across log messages in the cluster while sharing a same cluster identity; or
  wherein, when the component is identified as a non-variable component, a cluster that identifies any messages matching the component is defined such that a value for the component must be the same across log messages in the cluster to share the same cluster identity;
 wherein each of the one or more components includes a component determined to be a non-variable component.

15. The computer-implemented method as recited in claim 10, further comprising:
 generating a new-cluster time series for the cluster that is indicative of, for each time bin of a plurality of time bins, a quantity of log messages corresponding to the cluster identifier and having a timestamp within the time bin;
 generating a different-cluster time series for a different cluster that is indicative of, for each time bin of the plurality of time bins, a quantity of log messages corresponding to a different cluster identifier and having a timestamp within the time bin;
 presenting an interface that concurrently displays the new-cluster time series and the different-cluster time series.

16. The computer-implemented method as recited in claim 15, wherein the new-cluster time series and the different-cluster time series are displayed in a single graph.

17. The computer-implemented method as recited in claim 10, wherein the information includes the log message.

18. The computer-implemented method as recited in claim 10, further comprising, for each other cluster of one or more of the plurality of clusters:
 identifying a temporal characteristic of the other cluster corresponding to one or more time stamps associated with one or more log messages of the other cluster; and
 retrieving, from the data store, a representative log message for the other cluster, the representative log message being selected from amongst a plurality of log messages associated with an identifier of the other cluster in the data store;
 wherein the alert communication further includes the temporal characteristic of the other cluster and the representative log message for the other cluster.

19. A computer-implemented system comprising:
 one or more data processors; and
 a non-transitory computer readable storage medium containing instructions which; when executed on the one or more data processors, cause the one or more data processors to perform actions including:
  receiving a log message;
  parsing the log message into a plurality of components, each component of the plurality of components corresponding to a part of the log message;
  determining, for each of one or more components of the plurality of components, a value for the component from the log message; and
  determining a cluster identifier based at least in part on:
   one or more values of the one or more components; and
   one or more rules; and
  accessing a data store that associates, for each log message of a plurality of previously processed log messages, an identifier of the log message with an identifier of a corresponding cluster, the association with the corresponding cluster indicating that the log message has one or more content-based characteristics indicative of the corresponding cluster and is assigned to the corresponding cluster, and the corresponding cluster being of a plurality of clusters;
  querying the data store with the cluster identifier;

determining, based on a response to the query, that the cluster identifier corresponds to a new cluster;
in response to determining that the cluster identifier corresponds to a new cluster,
generating an alert communication that includes information that identifies the cluster.

20. The system as recited in claim 19, wherein:
the data store further associates, for each log message of the plurality of previously processed log messages, the identifier of the log message with a timestamp of the log message; and
determining that the cluster identifier corresponds to a new cluster includes:
  determining a quantity of log messages, the quantity of log messages representing the received log message and any log messages identified in the data store that are associated with a time stamp corresponding to a recent time period and with the cluster identifier;
  determining that the quantity of log messages has:
    increased by at least a pre-defined change threshold; or
    exceeded an upper pre-defined cluster-assignment threshold.

* * * * *

UNITED STATES PATENT AND TRADEMARK OFFICE
CERTIFICATE OF CORRECTION

PATENT NO. : 10,474,513 B2
APPLICATION NO. : 15/416868
DATED : November 12, 2019
INVENTOR(S) : Yoon et al.

Page 1 of 1

It is certified that error appears in the above-identified patent and that said Letters Patent is hereby corrected as shown below:

In the Specification

In Column 3, Line 23, delete "Upon" and insert -- upon --, therefor.

In Column 12, Line 46, before "contain" delete "that".

In the Claims

In Column 47, Line 37, in Claim 4, after "detecting" delete "that a".

In Column 49, Line 43, in Claim 13, after "detecting" delete "that a".

In Column 50, Line 44, in Claim 19, delete "which;" and insert -- which, --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*